(12) United States Patent
Mak

(10) Patent No.: US 9,885,203 B2
(45) Date of Patent: Feb. 6, 2018

(54) DOUBLE ACTION HINGES

(71) Applicant: C.M. Products Limited, Wanchai (CN)

(72) Inventor: Chi Yin Mak, Wanchai (CN)

(73) Assignee: C.M. Products Limited, Wanchai (CN)

( * ) Notice: Subject to any disclaimer, the term of this patent is extended or adjusted under 35 U.S.C. 154(b) by 58 days.

(21) Appl. No.: 14/991,587

(22) Filed: Jan. 8, 2016

(65) Prior Publication Data

US 2016/0201718 A1   Jul. 14, 2016

(30) Foreign Application Priority Data

Jan. 9, 2015   (CN) .......................... 2015 1 0012960

(51) Int. Cl.
| | | |
|---|---|---|
| *E05D 3/16* | (2006.01) | |
| *F16C 11/04* | (2006.01) | |
| *F16M 11/06* | (2006.01) | |
| *F16M 11/20* | (2006.01) | |

(52) U.S. Cl.
CPC ................ *E05D 3/16* (2013.01); *F16C 11/04* (2013.01); *F16M 11/06* (2013.01); *F16M 11/2007* (2013.01); *Y10T 16/5476* (2015.01)

(58) Field of Classification Search
CPC .. E05D 3/06; E05D 3/12; E05D 3/125; E05D 3/127; E05D 3/14; E05D 3/142; E05D 3/145; E05D 3/147; E05D 3/16; E05D 2003/163; E05D 2003/166
USPC ........................... 16/366, 368, 369, 370, 280
See application file for complete search history.

(56) References Cited

U.S. PATENT DOCUMENTS

| | | | | |
|---|---|---|---|---|
| 76,442 | A * | 4/1868 | Dumbolton ............... | E05D 3/12 16/302 |
| 83,760 | A * | 11/1868 | Carkeet .................... | E05D 3/12 16/366 |
| 828,649 | A * | 8/1906 | Greenawalt ............... | E05D 3/12 16/366 |
| 879,067 | A * | 2/1908 | Rodman .................... | E05D 3/16 16/369 |
| RE12,876 | E * | 11/1908 | Rodman ......................... | 16/369 |
| 1,144,404 | A * | 6/1915 | Williams ................... | E05D 1/06 16/260 |
| 1,375,212 | A * | 4/1921 | Crone ....................... | E05D 3/02 16/366 |
| 1,554,161 | A * | 9/1925 | Hubbard .................. | E05D 3/06 16/368 |
| 2,157,027 | A * | 5/1939 | Soss .......................... | E05D 3/16 16/250 |

(Continued)

*Primary Examiner* — Jeffrey O Brien
(74) *Attorney, Agent, or Firm* — McCarter & English, LLP; David R. Burns

(57) ABSTRACT

A double action hinge unit is disclosed which comprises a first base element, a second base element and at least two connection elements. Each base element has at least two upward extensions. Each connection element is hingedly connected with an extension of the first base element and an extension of the second base element. The double action hinge unit is changeable among at least three combination states. When the double action hinge unit is in a second combination state, the at least two connection elements are arranged side by side, such that the double action hinge unit is rotatable about a rotational axis at one side into a first combination state and is also rotatable about a rotational axis at the other side into a third combination state.

3 Claims, 36 Drawing Sheets

(56) References Cited

U.S. PATENT DOCUMENTS

| | | | | |
|---|---|---|---|---|
| 4,823,858 A * | 4/1989 | Perutz | E04B 2/7405 | 16/366 |
| 5,139,309 A * | 8/1992 | Kornreich | A47C 7/70 | 297/145 |
| 5,278,725 A * | 1/1994 | Konno | G06F 1/1616 | 16/223 |
| 5,410,779 A * | 5/1995 | Esman | E05D 3/08 | 16/288 |
| 5,493,760 A * | 2/1996 | Takimoto | E05D 3/12 | 16/366 |
| 6,154,359 A * | 11/2000 | Kamikakai | G06F 1/1618 | 16/342 |
| 7,328,481 B2 * | 2/2008 | Barnett | E05D 3/08 | 16/227 |
| 7,832,057 B2 * | 11/2010 | Hoffman | E05D 3/06 | 16/287 |
| 7,966,698 B2 * | 6/2011 | Barnett | H04M 1/0212 | 16/340 |
| 8,272,101 B2 * | 9/2012 | Wagner | E05D 3/08 | 16/231 |
| 8,904,602 B2 * | 12/2014 | Hsu | G06F 1/1681 | 16/282 |
| 8,943,651 B2 * | 2/2015 | Hsu | H05K 5/0226 | 16/366 |
| 2016/0040764 A1 * | 2/2016 | Park | G09F 9/301 | 361/679.01 |
| 2016/0104991 A1 * | 4/2016 | Huang | H01R 39/64 | 403/42 |
| 2016/0147267 A1 * | 5/2016 | Campbell | G06F 1/1681 | 361/679.27 |
| 2016/0202736 A1 * | 7/2016 | Huang | G06F 1/1681 | 16/369 |
| 2016/0215541 A1 * | 7/2016 | Tazbaz | E05D 3/14 | |
| 2017/0183895 A1 * | 6/2017 | Chen | E05D 3/14 | |
| 2017/0185104 A1 * | 6/2017 | Krivoy | G06F 1/1618 | |

* cited by examiner

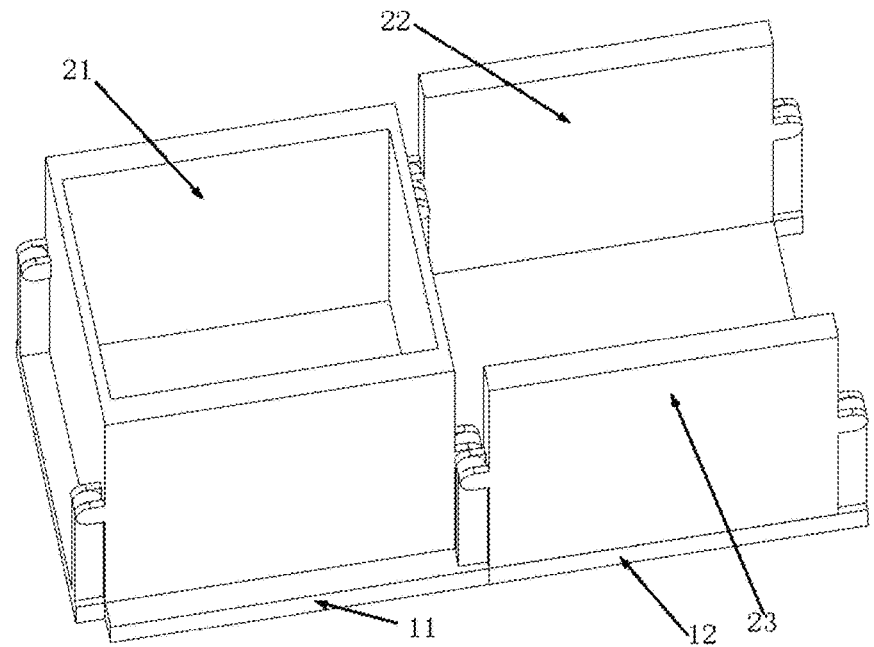
FIG. 13
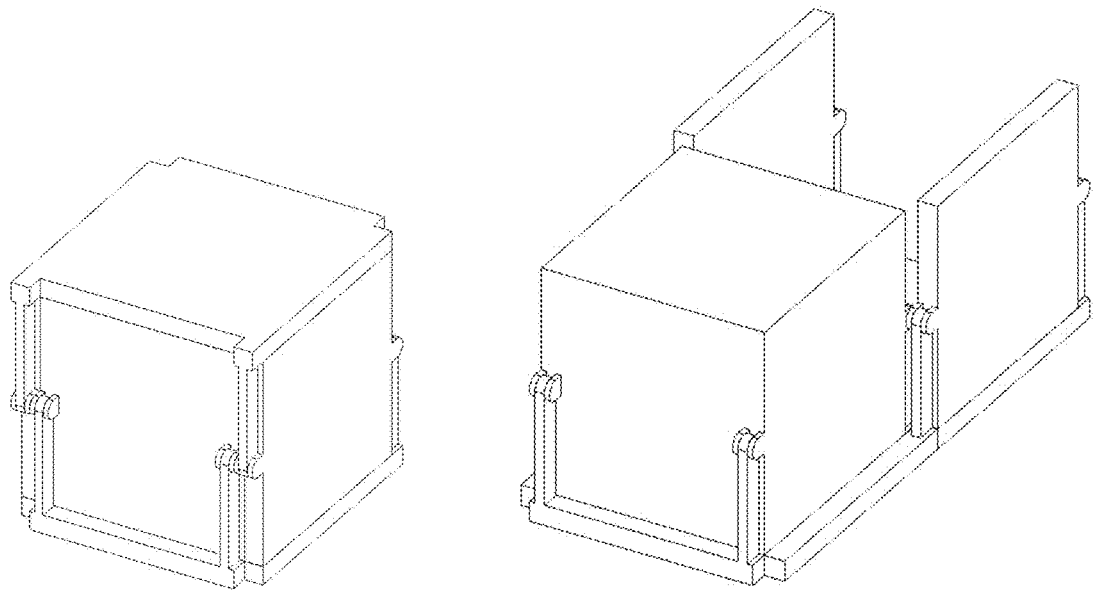
FIG. 13a
FIG. 13b

DOUBLE ACTION HINGES

RELATED APPLICATIONS

This application claims priority to and benefit of Chinese Patent Application 201510012960.4, filed on Jan. 9, 2015, the disclosure of which is incorporated herein by reference in its entirety.

TECHNICAL FIELD

The invention relates to hinges, more specifically, relates to double action hinges suitable for industrial applications.

BACKGROUND

U.S. Pat. No. 2,245,875 discloses a toy formed by a plurality of foldable hinge unit connected in series. With reference to FIGS. 19-20, each unit comprises two plates 40, 41 connected by three ribbons. Two ribbons 42 are used to connect the left ends of the two plates 40, 41. The remaining ribbon 47 is located between the two ribbons 42 and used to connect the right ends of the two plates 40, 41. The first plate 40 can be rotated 180 degrees clockwise with respect to the left end of the second plate 41 so that the first plate 40 covers the second plate 41. Then the first plate 40 can be further rotated 180 degrees clockwise with respect to the right end of the second plate 41. After that, the first plate 40 will be on the right side of the second plate 41.

In order to avoid obstructing the rotational movements, the two plates in U.S. Pat. No. 2,245,875 are connected by ribbons having a negligible thickness. As a result, the disclosed structure may not be able to meet the requirements of industrial applications.

SUMMARY OF THE INVENTION

The objective of the present invention is to provide a double action hinge unit, which not only keeps the features of the prior design, but also allows connection using elements having a larger thickness so that the new hinge unit is easy to assemble and has a improved structural strength suitable for various applications.

The present invention provides a double action hinge unit, comprising: a first base element, comprising a first extension and a second extension both extending upward from said first base element; a second base element, comprising a fourth extension and a fifth extension both extending upward from said second base element; a first connection element that is hingedly connected with said first extension about a first rotational axis and is hingedly connected with said fourth extension about a second rotational axis; a second connection element that is hingedly connected with said second extension about a third rotational axis and is hingedly connected with said fifth extension about a fourth rotational axis. When said double action hinge unit is in a first combination state, said second and third rotational axes are co-axial, and said first and fourth rotational axes are not co-axial. Upon rotating said first base element with respect to said second base element about said second and third rotational axes by a certain angle, said double action hinge unit is changed from said first combination state into a second combination state; when said double action hinge unit is in said second combination state, said second and third rotational axes are co-axial, and said first and fourth rotational axes are also co-axial. Upon rotating said first base element about said second base element about said first and fourth rotational axes by a certain angle, said double action hinge unit is changed from said second combination state into a third combination state, when said double action hinge unit is in said third combination state, said second and third rotational axes are not co-axial, and said first and fourth rotational axes are co-axial.

Preferably, said first base element comprises a first projected portion at a first end and a first recessed portion at a second end, and said second base element comprises a second projected portion at a first end and a second recessed portion at a second end. Said second projected portion is received in the space of said first recessed portion when said double action hinge unit is in said first combination state, and said first projected portion is received in the space of said second recessed portion when said double action hinge unit is in said third combination state. Preferably, said first base element further comprises a third extension extending upward therefrom, and said second base element further comprises a sixth extension extending upward therefrom. Said double action hinge unit further comprises a third connection element that is hingedly connected with said third extension about a fifth rotational axis and is hingedly connected with said sixth extension about a sixth rotational axis. When said double action hinge unit is in said first and second combination states, said second, third and fifth rotational axes are co-axial, when said double action hinge unit is in said second and third combination states, said first, fourth and sixth rotational axes are co-axial.

Preferably, said first extension extends upward from said first projected portion. Said second and third extensions respectively extend upward from shoulders on two sides of said first recessed portion. Said fourth extension extends upward from said second projected portion. Said fifth and sixth extensions respectively extend upward from shoulders on two sides of said second recessed portion.

Preferably, said first base element consists of a first body and a first and a second auxiliary parts hingedly connected to said first body, with said first and second auxiliary parts respectively forming said first and second extensions. Said second base element consists of a second body and a fourth and a fifth auxiliary parts hingedly connected to said second body, with said fourth and fifth auxiliary parts respectively forming said fourth and fifth extensions.

Preferably, said first base element further comprises a seventh extension extending downward from said first projected portion, and an eighth and a ninth extensions extending downward from the shoulders on two sides of said first recessed portion. Said double action hinge unit further comprises: a third base element, comprising a third projected portion at a first end, a third recessed portion at a second end, a tenth extension extending downward from said third projected portion, and an eleventh and a twelfth extensions extending downward from shoulders on two sides of said third recessed portion; a fourth connection element that is hingedly connected with said tenth extension about a seventh rotational axis and is hingedly connected with said seventh extension about an eighth rotational axis; a fifth connection element that is hingedly connected with said eleventh extension about a ninth rotational axis and is hingedly connected with said eighth extension about a tenth rotational axis; a sixth connection element that is hingedly connected with said twelfth extension about an eleventh rotational axis and is hingedly connected with said ninth extension about a twelfth rotational axis. When said double action hinge unit is in the first combination state, said eighth, ninth and eleventh rotational axes are co-axial. Upon rotating said third base element about said first base element around said eighth, ninth and eleventh rotational axes by a certain angle, said double action hinge unit is changed from said first combination state into a fourth combination state; when said double action hinge unit is in said fourth combination state, said eighth, ninth and eleventh rotational axes are co-axial, and said seventh, tenth and twelfth rotational axes are also co-axial.

BRIEF DESCRIPTION OF THE DRAWINGS

The invention is described in conjunction with the accompanying drawings in which:

FIGS. 3c-0-3c-2 show different states of the hinge according to the third embodiment;

FIGS. 5-1-5-12 shows hinges having body extensions according to the invention;

FIG. 6 shows a hinge according to a sixth embodiment of the invention;

FIGS. 8-8a show hinges according to an eighth embodiment of the invention;

FIG. 9 shows a hinge according to a ninth embodiment of the invention;

FIG. 10 shows a hinge according to a tenth embodiment of the invention;

FIG. 11 shows a hinge according to an eleventh embodiment of the invention;

FIGS. 12-12k show hinges according to a twelfth embodiment of the invention;

DETAILED DESCRIPTION OF THE INVENTION

Figure 1A:
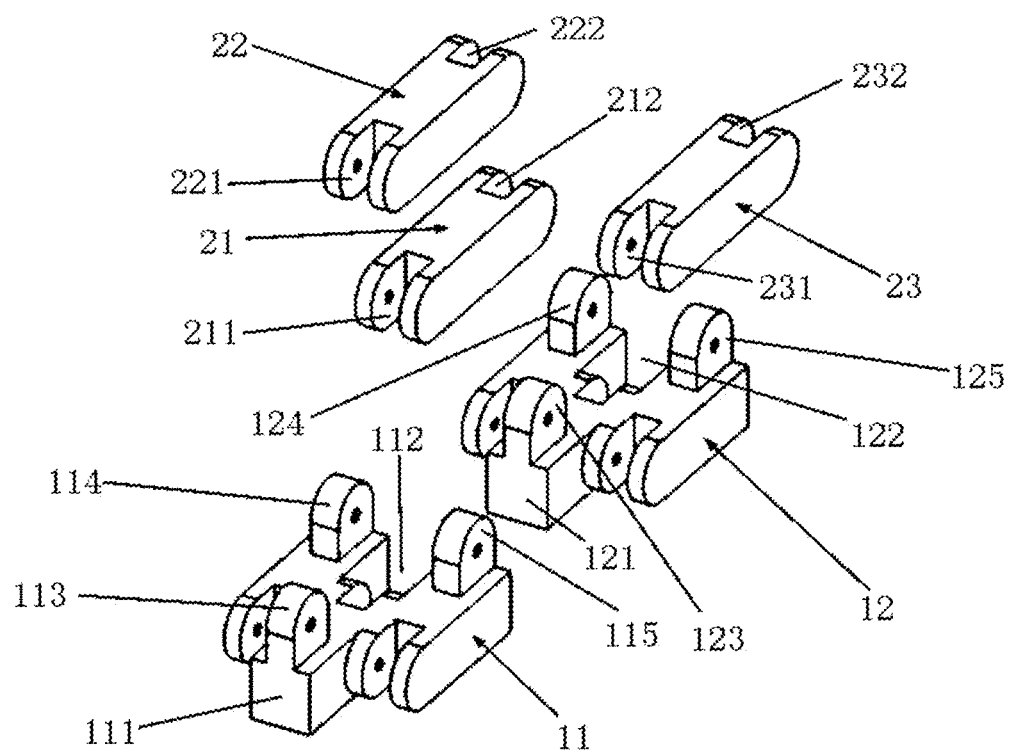
FIG. 1a is an exploded view showing a hinge according to a first embodiment of the invention.

For the purpose of understanding the technical features, objectives and effects of the application clearly, specific embodiments of the invention are described with reference to the drawings.

The features of hinges according to the embodiments of the present invention will be detailedly discussed below. The same element, similar elements or elements having similar functions are indicated by the same or similar reference numerals in the drawings.

It should be noted that the orientations or positional relationships described by terms "front", "rear", "upper", "lower", "upward", "downward", "above", "below" facilitate the understanding of the present description. These terms shall not be construed as limiting the present invention. In addition, the terms "first", "second", "third" are used for descriptive purpose only and shall not be construed as being indicative of level of importance.

Figure 1B:
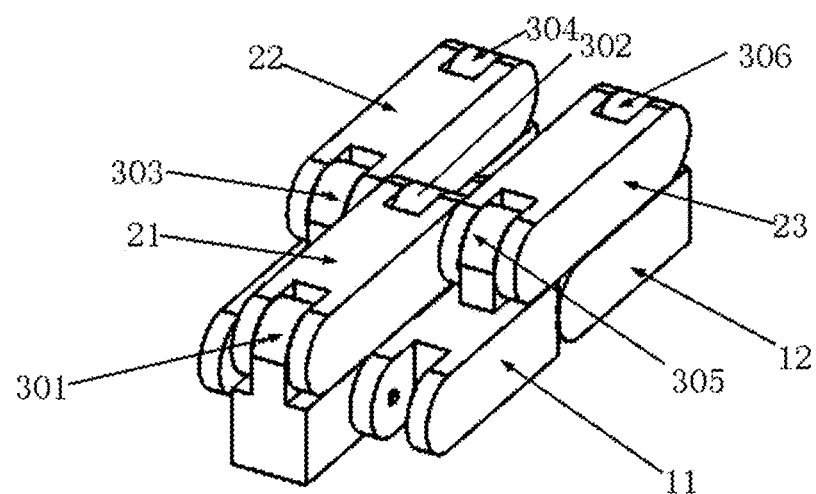
FIG. 1b is a view showing a first combination state of the hinge according to the first embodiment.
Figure 1C:
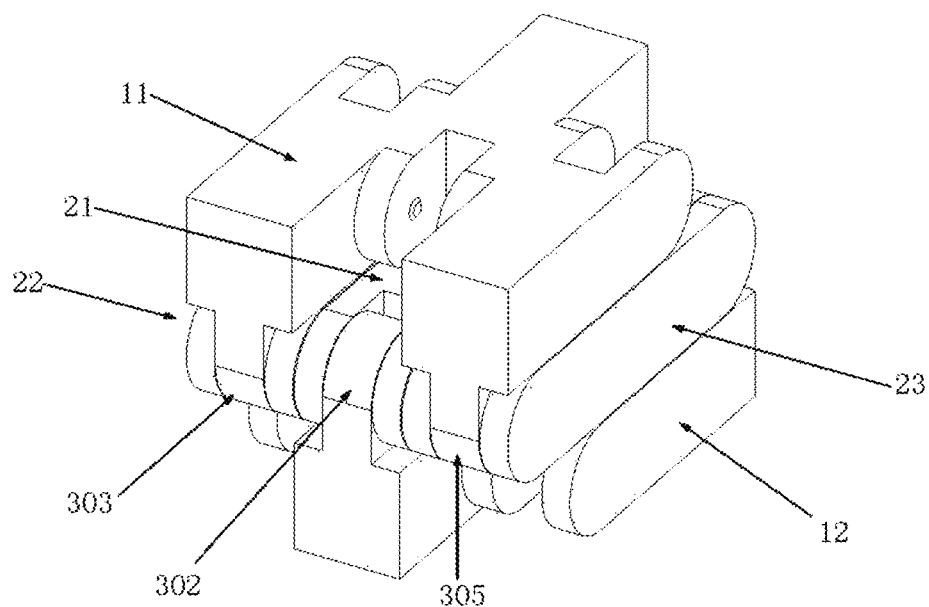
FIG. 1c is a view showing a second combination state of the hinge according to the first embodiment.
Figure 16A:
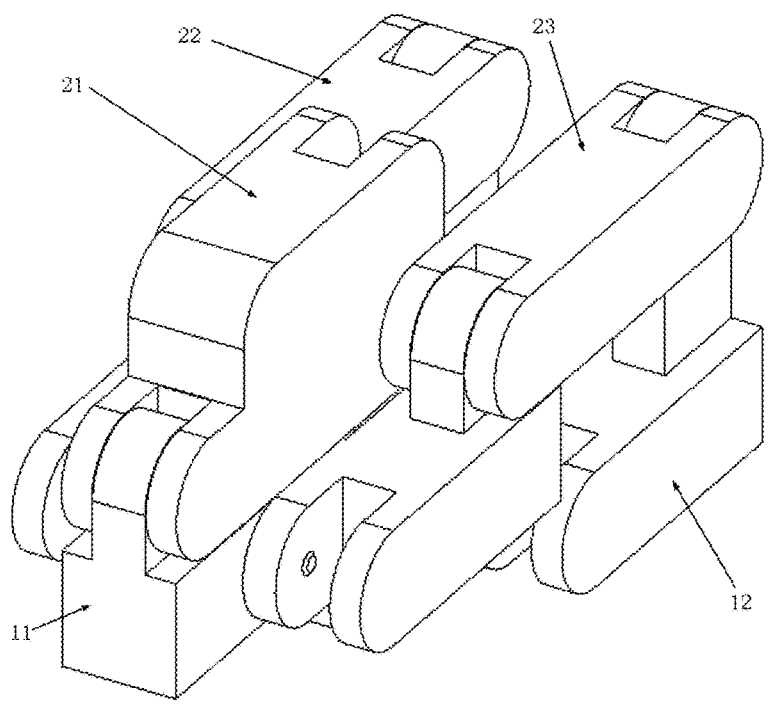
FIGS. 16a-16c show a hinge according to a sixteenth embodiment of the invention.
Figure 16B:
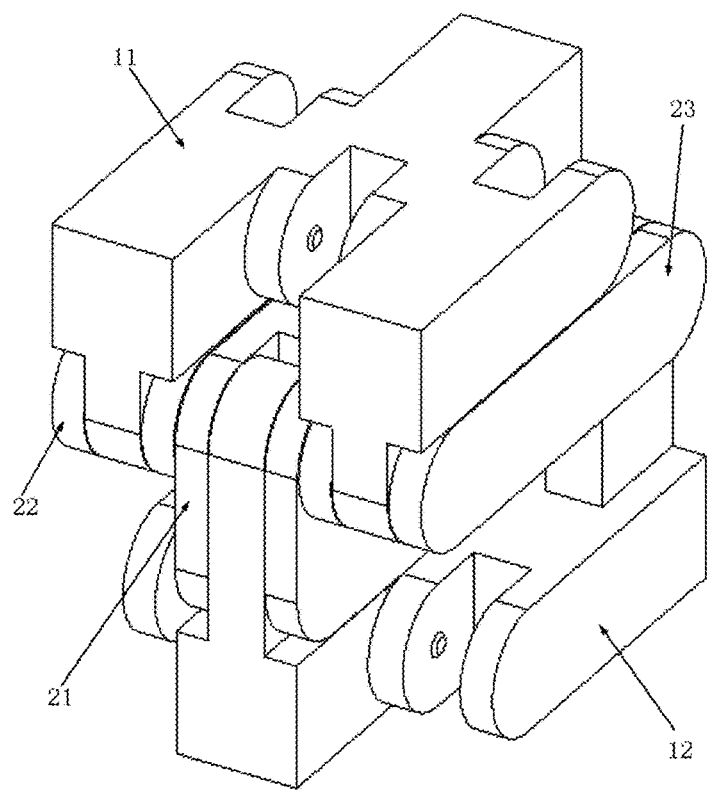
Figure 16C:
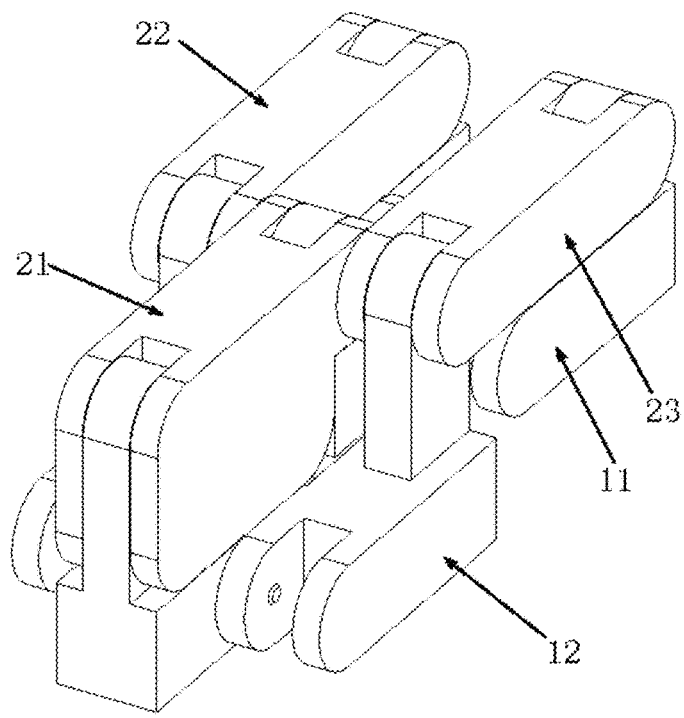

FIGS. 1a-1c illustrate a hinge according to a first embodiment of the present invention. A basic unit is used to explain the structure and connecting relationship of elements of the hinge. In this embodiment, the hinge comprises two base elements 11, 12 and three connection elements 21, 22, 23. The two base elements 11, 12 are identical and the three connection elements are also identical. Nevertheless, the base elements and the connection elements may also have different shapes, for example, as shown in FIGS. 16a-16c.

The first base element 11 has a projected portion 111 at its first end and a recessed portion 112 at its second end. The second base element 12 has a projected portion 121 at its first end and a recessed portion 122 at its second end. There may be only one projected portion and only one recessed portion on each base element. Alternatively, multiple projected and recessed portions having different shapes and/or sizes can be formed on each base element.

The first base element 11 has three connecting portions 113, 114, 115 extending upward therefrom. Connecting portions 113 is located at a first end of the first base element 11. Connecting portions 114, 115 are located at a second end of the first base element 11. Connecting portions 114, 115 can be arranged symmetrically or asymmetrically with respect to an axis in the middle. Connecting portions 113 can be located on or offset from the middle axis. Likewise, the second base element 12 has three connecting portions 123, 124, 125 extending upward therefrom. The shapes of the three connection elements 21, 22, 23 can be identical or different. The first connection element 21 has a connecting portion 211 at a first end and a connecting portion 212 at a second end. The second connection element 22 has a connecting portion 221 at a first end and a connecting portion 222 at a second end. The third connection element 23 has a connecting portion 231 at a first end and a connecting portion 232 at a second end.

The three connection elements 21, 22, 23 connect the two base elements 11, 12. Specifically, connecting portion 211 at the first end of the first connection element 21 and connection portion 113 of the first base element 11 form a first hinged connection about a first rotational axis 301. Connecting portion 212 at the second end of the first connection element 21 and connection portion 123 of the second base element 12 form a second hinged connection about a second rotational axis 302. Connecting portion 221 at the first end of the second connection element 22 and connecting portion 114 of the first base element 11 form a third hinged connection about a third rotational axis 303. Connecting portion 222 at the second end of the second connection element 22 and connecting portion 124 of the second base element 12 form a fourth hinged connection about a fourth rotational axis 304. Connecting portion 231 at the first end of the third connection element 23 and connecting portion 115 of the first base element 11 form a fifth hinged connection about a fifth rotational axis 305. Connecting portion 232 at the second end of the third connection element 23 and connecting portion 125 of the second base element 12 form a sixth hinged connection about a sixth rotational axis 306. All hinged connections can be either detachable or non-detachable.

The hinge according to the present invention has at least three different combination states. In this embodiment, when the hinge is in the first combination state, as shown in FIG. 1b, the first and second base element 11, 12 are coplanar. Rotational axes 301-306 of the hinged connections are not in the plane of the base elements 11, 12. In other embodiments (such as FIGS. 16a-16c), it is possible that the two base elements 11, 12 are not coplanar.

When the hinge is in the first combination state, rotational axes 302, 303, 305 of the second, third and fifth hinged connections are co-axial. The hinge is brought into a second combination state after a 180-degree clockwise rotation of the first base element 11 about the rotational axis 302 of the second hinged connection. When the hinge is in the second combination state, as shown in FIG. 1c, rotational axes 302, 303, 305 of the second, third and fifth hinged connections remain co-axial, and rotational axes 301, 304, 306 of the first, fourth and sixth hinged connections become co-axial. Moreover, in the second combination state, the first, second and third connection elements 21, 22, 23 are arranged side by side.

The hinged connections between connection elements 21, 22, 23 and base elements 11, 12 can be achieved by pin-and-hole fittings. As shown in FIG. 1a, both ends of each connection element have a pair of arms. The materials forming these arms may be elastic. Elasticity may also be obtained from additional parts. The inner side of each arm is provided with a pin or a hole. On the other hand, the base elements each have connecting portions which can be inserted between a pair of arms. The connecting portion of the base element is provided with a mating pin or hole. The connection portions of the base elements and the connection elements can be exchanged. That is, a hinged connection can be formed by coupling an end of connection elements between a pair of arms extended from the base elements. Alternatively, the hinged connections can also be achieved by ball-and-socket fittings or in other possible manners.

In the second combination state as shown in FIG. 1c, the rotational axes 302, 303, 305 of the second, third and fifth hinged connections are co-axial, and the rotational axes 301, 304, 306 of the first, fourth and sixth hinged connections are also co-axial (not visible in FIG. 1c). The first base element 11 can continue to rotate clockwise about the rotational axis 301 by 180 degrees to change the hinge into a third combination state, or rotate 180 degrees anticlockwise about the rotational axis 302 to return the hinge to the first combination state. The clockwise and anticlockwise rotations of the first base element 11 are described with respect to the second base element 12. It should be understood that the second base element 12 can also rotate with respect to the first base element 11. For example, when the hinge is in the second combination state, the first base element 11 can be maintained stationary and the second base element 12 is able to rotate clockwise or anticlockwise.

The configuration of the hinge in the third combination state is generally the same as that in the first combination state, with the exception that locations of the first and second base elements 11, 12 have been exchanged. Specifically, when the hinge is in the first combination state shown in FIG. 1b, the first base element 11 is in front of the second base element 12. When the hinge is in the third combination state (not shown), the first base element 11 is behind the second base element 12. The positions of the connection elements 21-23 remain the same. However, the upper and lower surfaces of the connection elements 21-23 turn upside down. When the hinge is in the third combination state, the space in the recessed portion 122 at the second end of the second base element 12 receives the projected portion 111 at the first end of the first base element 11. Rotational axes of the first, fourth and sixth hinged connections are co-axial, and rotational axes 302, 303, 305 of the second, third and fifth hinged connections are not co-axial.

The movement of the hinge according to the present invention is restricted. When the hinge is in the first combination state, rotation of the hinge is enabled since the three rotational axes 302, 303, 305 in the middle are co-axial. However, the hinge cannot rotate about the rotational axes 301, 304, 306 at two ends. When the hinge is in the second combination state, the rotational axes 301, 304, 306 become co-axial, thus allowing rotation. In other words, the requirement of a rotational movement is that relevant rotational axes must be co-axial.

In this embodiment, the projected portion 111 mates with the recessed portion 122, and the projected portion 112 mates with the recessed portion 121. In another embodiment, the projected portion 111 and the recessed portion 122 are moved to one side, and the projected portion 121 and the recessed portion 112 are moved to the other side. The shapes of the projected portion and the recessed portion of the same base element can be identical or different. The mating between the projected and recesses portions means that the space in the recessed portion can accommodate the projected portion. A perfect match is not required.

Although three connection elements are used in the first embodiment to establish a stable connection between the two base elements, two connection elements can achieve similar effects. In a hinge unit having two connection elements (e.g. connection elements 21, 22), the connecting portions 115, 125 on the first and second base elements 11, 12 can be eliminated. FIGS. 6-8 illustrates hinges with only two connection elements.

Figure 2A:
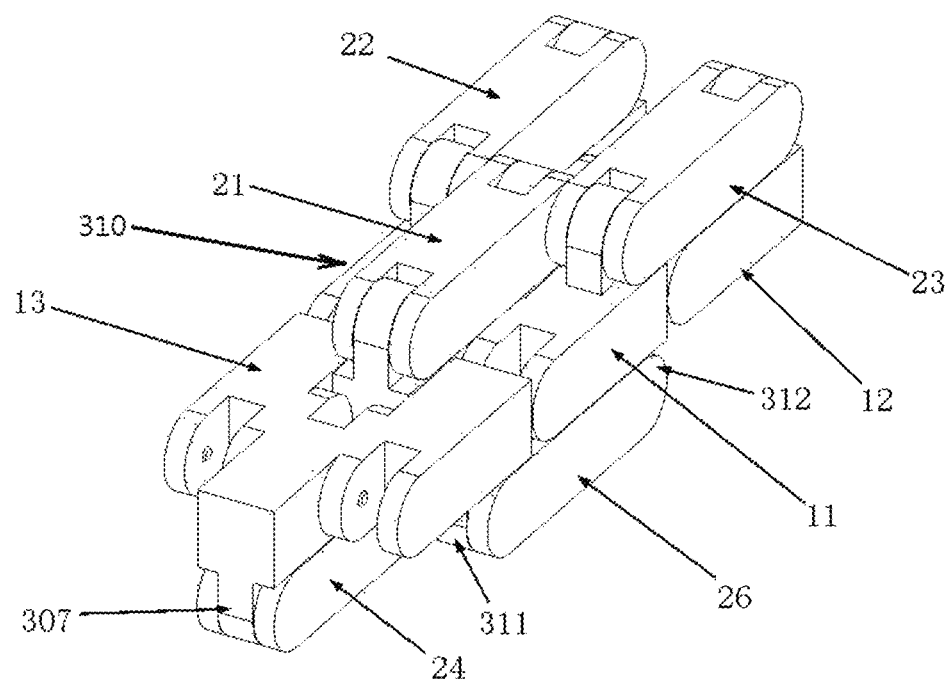
FIGS. 2a-2b are views showing a hinge according to a second embodiment of the invention.
Figure 2B:
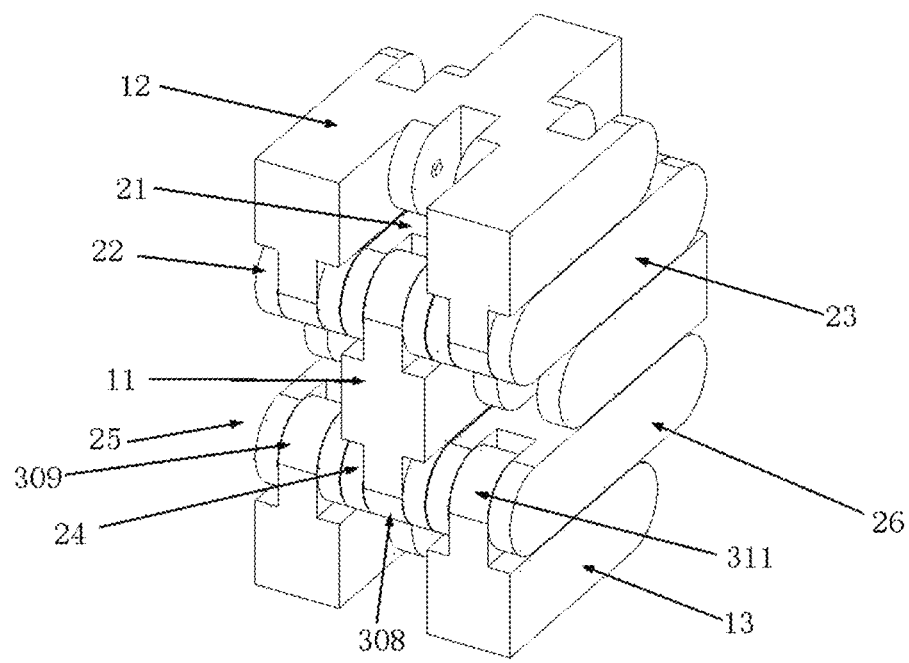

FIGS. 2a-2b illustrate a hinge according to a second embodiment of the present invention. A basic combination unit is used to explain the structure and connection of the hinge. The second embodiment is a modified version of the first embodiment. The second embodiment adds another base element 13 and three connecting portions 24, 25, 26. As a result, the hinge comprises three base elements 11, 12, 13 and six connection elements 21, 22, 23, 24, 25, 26. Compared with the first embodiment, the first base element 11 in the second embodiment further includes three connecting portions extending from the lower side. The three downward extending connecting portions and the three upward extending connecting portions 113, 114, 115 can be arranged symmetrically or asymmetrically. The second and third base elements 12, 13 share the same structures as those in the first embodiment. The width and height may differ.

With reference to FIGS. 2a-2b, in the second embodiment, a first end of the fourth connection element 24 and the third base element 13 form a seventh hinged connection about a seventh rotational axis 307. A second end of the fourth connection element 24 and the first base element 11 form an eighth hinged connection about an eighth rotational axis 308. A first end of the fifth connection element 25 and the third base element 13 form a ninth hinged connection about a ninth rotational axis 309. A second end of the fifth connection element 25 and the first base element 11 form a tenth hinged connection about a tenth rotational axis 310. A first end of the sixth connection element 26 and the third base element 13 form an eleventh hinged connection about an eleventh rotational axis 311. A second end of the sixth connection element 26 and the first base element 11 form a twelfth hinged connection about a twelfth rotational axis 312.

The second embodiment can be considered as a combination of two hinges of the first embodiment. An upper part of the first base element 11 in FIG. 2*a* and the second base element 12 form one hinge. Meanwhile, a lower part of the first base element 11 and the third base element 13 form another hinge. In additional to the three combination states in the first embodiment, the hinge according to the second embodiment further has a fourth combination state.

When the hinge is in the first combination state, as shown in FIG. 2*a*, the third base element 13 and the first base element 11 are coplanar, and the eighth, ninth and eleventh rotational axes 308, 309, 311 are co-axial. The hinge can be brought into a fourth combination state upon a 180-degree anticlockwise rotation of the third base element 13 about the eighth rotational axis 308. When the hinge is in the fourth combination state, the seventh, tenth and twelfth rotational axes 307, 310, 312 become co-axial. And the fourth, fifth and sixth connection elements 24, 25, 26 are arranged side by side.

By rotating the second base element 12 180 degrees anticlockwise and rotating the third base element 13 180 degrees anticlockwise, the state of the hinge can be changed from FIG. 2*a* to FIG. 2*b*. When the hinge is in the state shown in FIG. 2*b*, both of the second base element 12 and the third base element 13 can rotate either clockwise or anticlockwise.

Figure 2C:
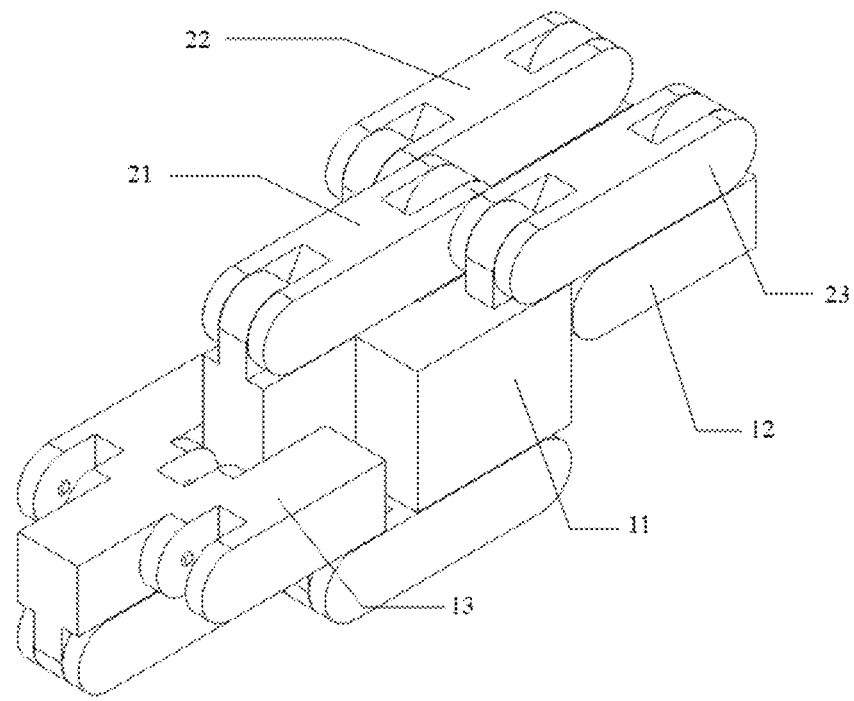
FIGS. 2c-2e show a variant of the hinge according to the second embodiment.
Figure 2D:
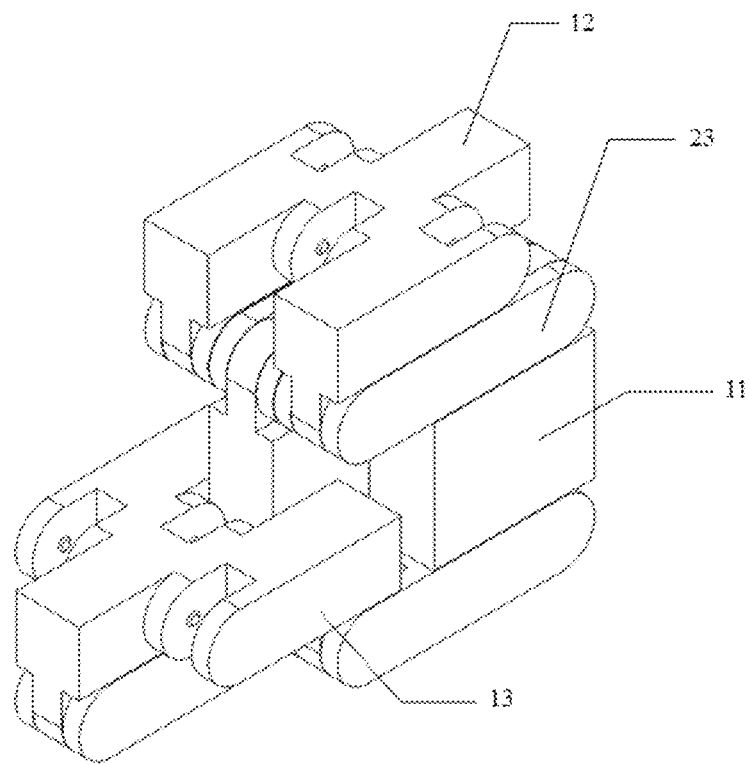
Figure 2E:
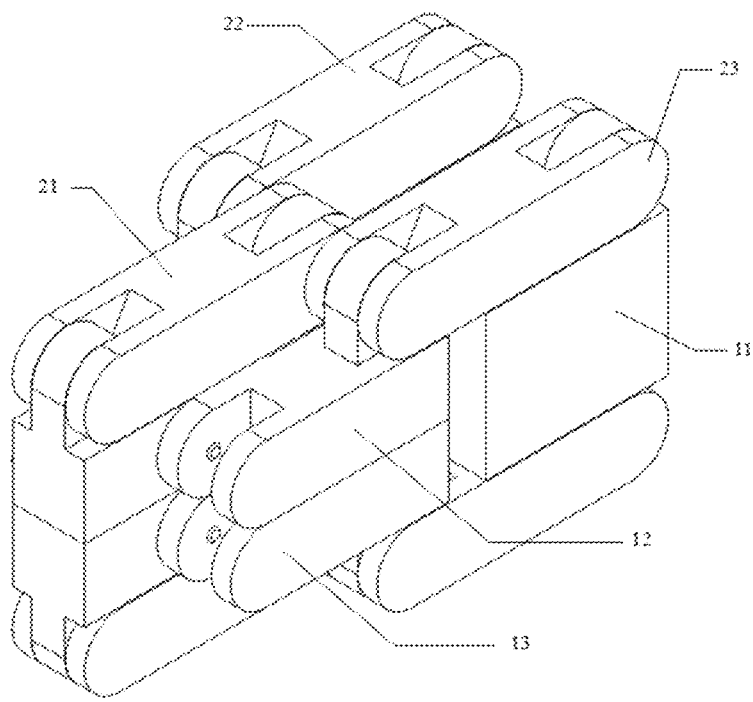

FIGS. 2*c*-2*e* show a variant of the second embodiment. Compared with the hinge in FIG. 2*a*, the height of the first base element 11 of the hinge in FIG. 2*c* is increased. The state of the hinge can be changed from FIG. 2*c* to FIG. 2*d* by a 180-degree anticlockwise rotation of the second base element 12. The state of the hinge can be further changed from FIG. 2*d* to FIG. 2*e* by another 180-degree anticlockwise rotation of the second base element 12. If the height of the first base element 11 is equal to or larger than the sum of heights of the second and third base elements 12, 13, sufficient space will be provided to allow accommodation of the second and third base elements 12, 13 simultaneously on the same side of the first base element 11.

As a further variant of the second embodiment, the second base element 12 and/or the third base element 13 may also be configured to include both upward and downward extending portions, which allow connection with additional base elements. A ring-shaped hinge can be formed by connecting multiple base elements together in an end-to-end manner.

Figure 17:
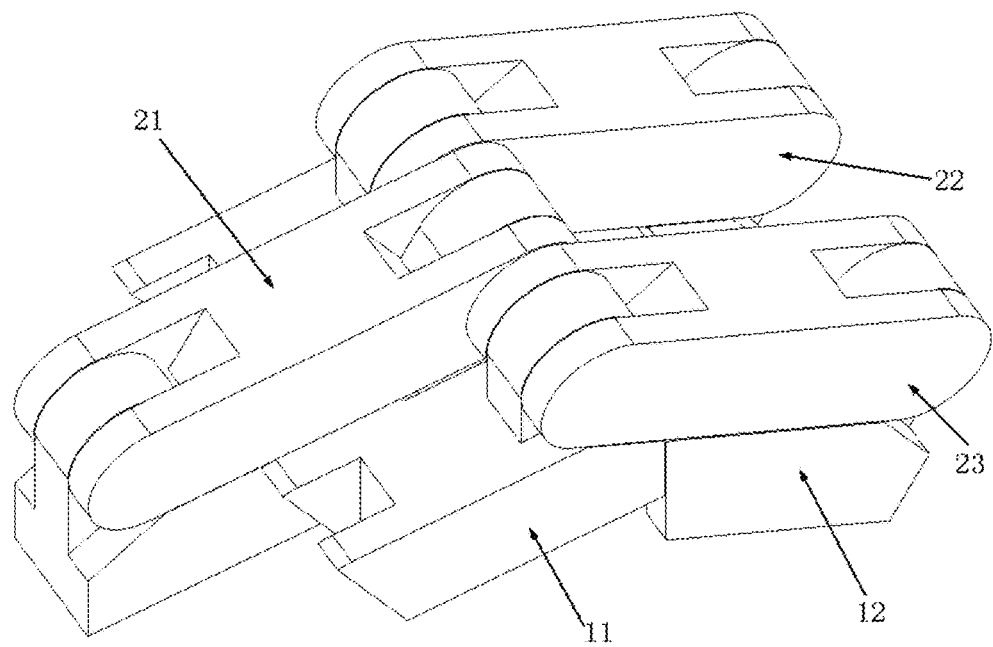
FIGS. 17-17c show a hinge according to a seventeenth embodiment of the invention.

Although a 180-degree rotation is required to change the state of the hinge in the first and second embodiments, the angle of rotation is not limited to 180 degrees for other hinge designs (e.g. the embodiment shown in FIG. 17). It should be noted that if the angle of rotation is less than or equal to 90 degrees, the projected parts 111, 121 and recessed parts 112, 122 at the two ends of the base elements 11, 12 may be omitted.

Figure 3:
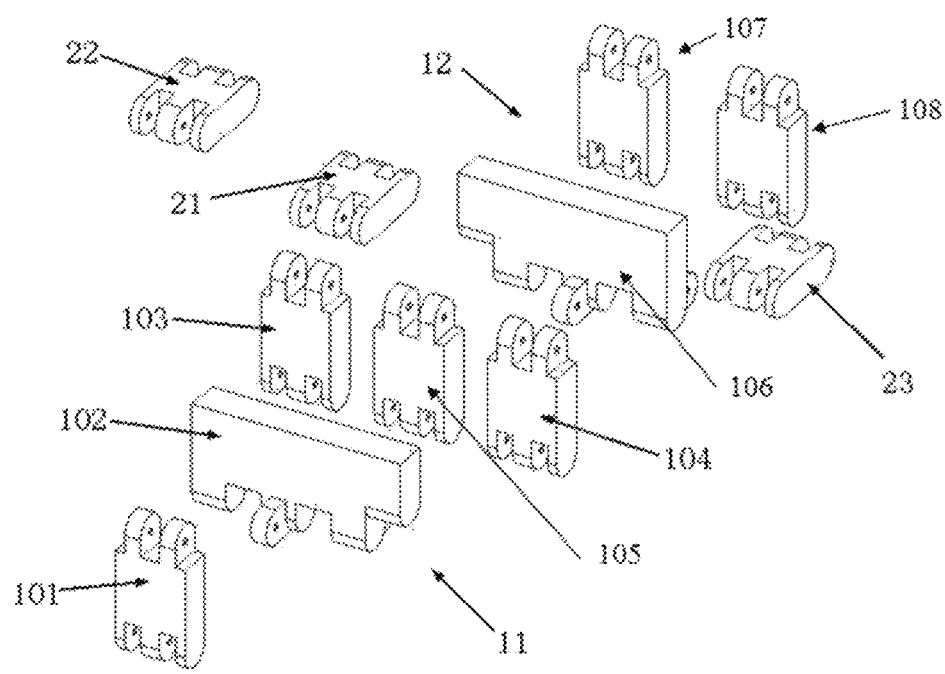
FIGS. 3-3a are exploded views showing a hinge according to a third embodiment of the invention.
Figure 3A:
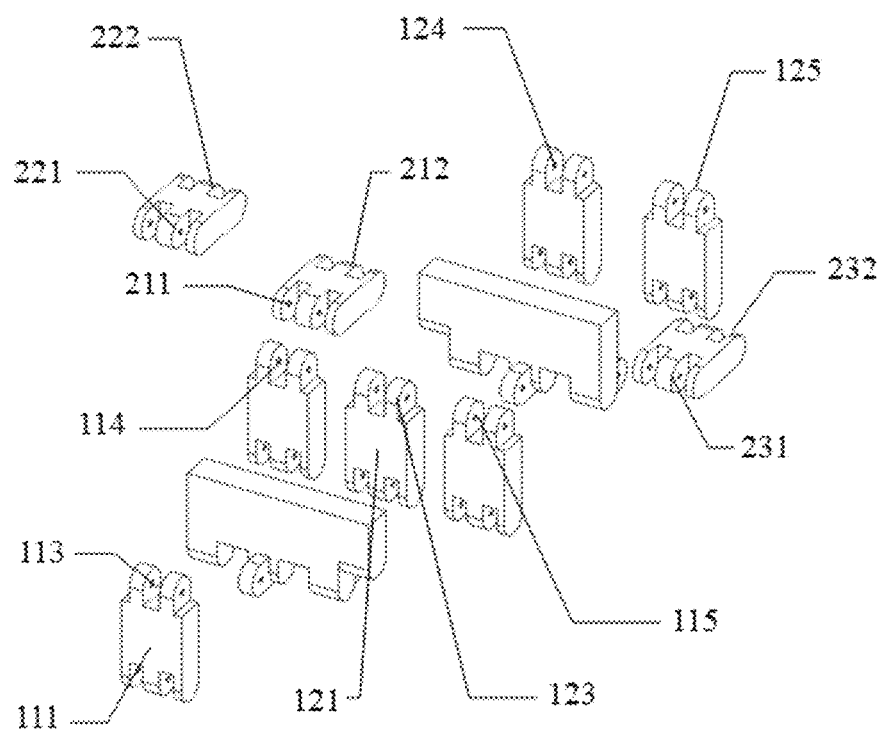
Figure 3B:
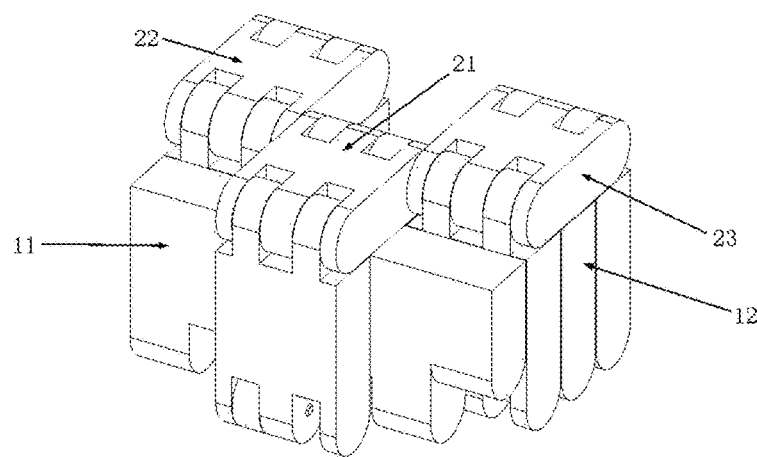
FIG. 3b is a view showing a first combination state of the hinge according to the third embodiment.

FIGS. 3-3*b* illustrate a hinge according to a third embodiment of the invention. A basic unit is used to explain the structure and connecting relationship of the hinge. The third embodiment is also a modified version of the first embodiment. The hinge in the third embodiment comprises two base elements 11, 12 and three connection elements 21, 22, 23. Each of the base elements 11, 12 is formed by multiple parts. The first base element 11 consists of a body 102, a first auxiliary part 101, a second auxiliary part 103 and a third auxiliary part 104. The auxiliary parts 101, 103, 104 are respectively hingedly connected to the body 102 at their lower ends. The heights of the first, second and third auxiliary parts 101, 103, 104 are made larger than the height of the body 102 so that the upper ends of the auxiliary parts 101, 103, 104 form the connecting portions 113, 114, 115. Likewise, the second base element 12 consists of a body 106, a fourth auxiliary part 105, a fifth auxiliary part 107 and a sixth auxiliary part 108. The auxiliary parts 105, 107, 108 are respectively hingedly connected to the body 106 at their lower ends. The heights of the auxiliary parts 105, 107, 108 are made larger than the height of the body 106 so that the upper ends of the auxiliary parts 105, 107, 108 form the connecting portions 123, 124, 125. As shown in FIGS. 3*a*-3*b*, two ends 211, 212 of the first connection elements 21 are respectively hingedly connected to the connecting portions 113, 123 of the first and fourth auxiliary parts 101, 105. Two ends 221, 222 of the second connection elements 22 are respectively hingedly connected to the connecting portions 114, 124 of the second and fifth auxiliary parts 103, 107. And two ends 231, 232 of the third connection elements 23 are respectively hingedly connected to the connecting portions 115, 125 of the third and sixth auxiliary parts 104, 108.

If a hinge has only two connection elements 21, 22, the third auxiliary part 104 of the first base element 11 and the sixth auxiliary part 108 of the second base element 12 can be omitted.

Figure 3C:
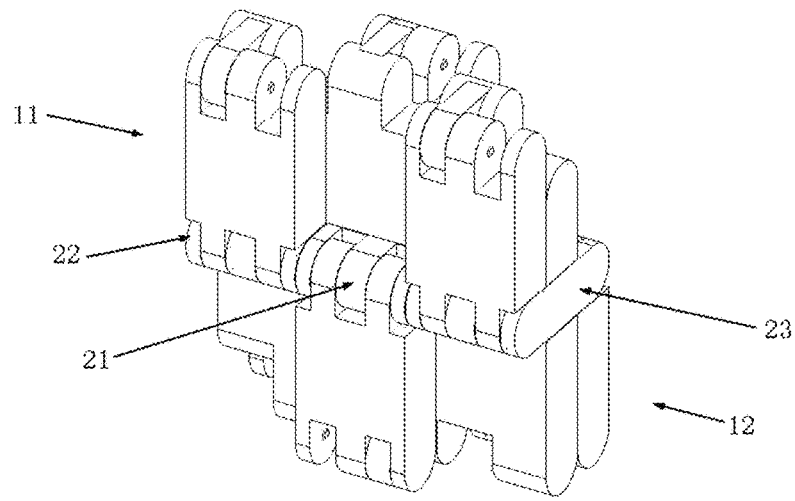
FIG. 3c is a view showing a second combination state of the hinge according to the third embodiment.
Figures 0, 3C:
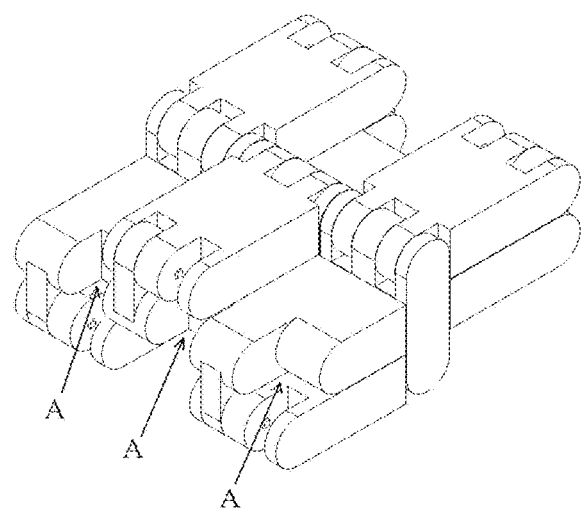
Figures 1, 3C:
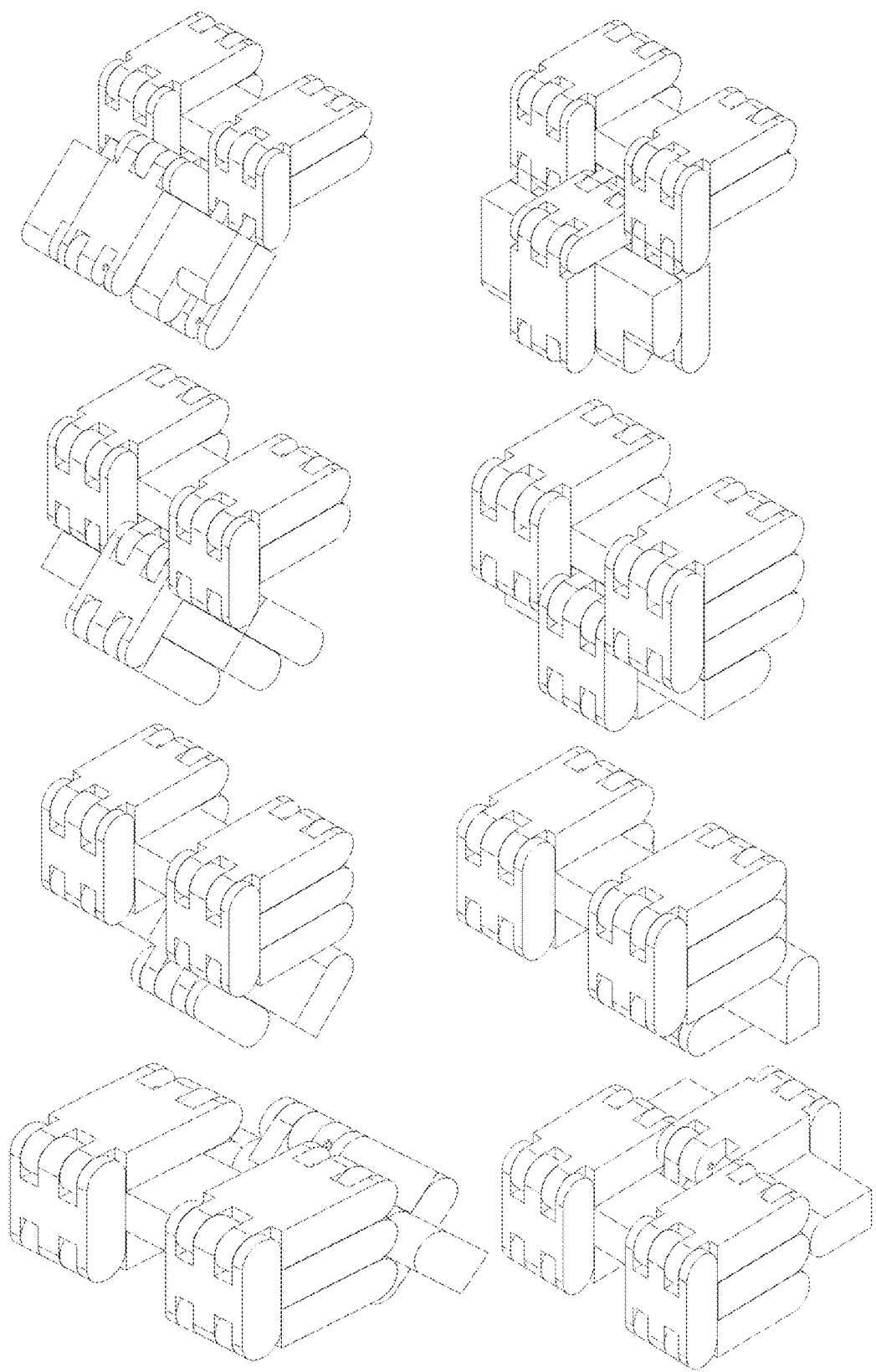
Figures 2, 3C:
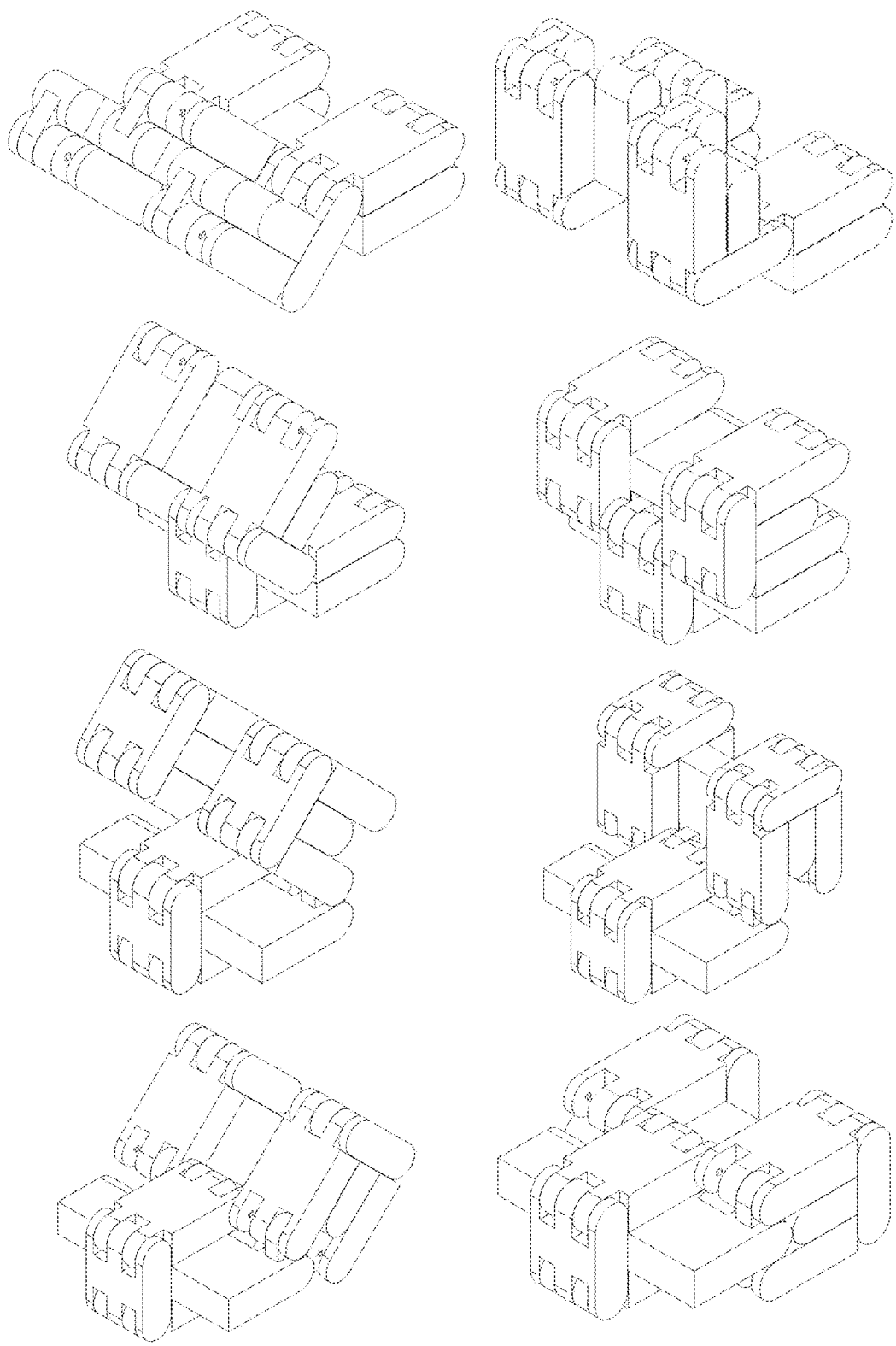

FIG. 3*b* shows a first combination state of the hinge. FIG. 3*c* shows a second combination state of the hinge. The state shown in FIG. 3*c*-0 is obtained by turning the whole hinge in FIG. 3*c* anticlockwise by 180 degrees. The hinge in FIG. 3*c*-0 resembles the hinge in FIG. 1*b*. FIG. 3*c*-1 shows a group of states of the hinge obtained by successively rotating the left base element in FIG. 3*c*-0 anticlockwise by 45 degrees. FIG. 3*c*-2 shows another group of states of the hinge obtained by successively rotating the left base element in FIG. 3*c*-0 clockwise by 45 degrees. Compared with the first embodiment, the number of possible flip actions of the hinge according to the third embodiment doubles. The reason is that the connecting portions in the third embodiment are hingedly connected to the base elements, while the connecting portions in the first embodiment are fixedly mounted to the base elements.

Figure 3D:
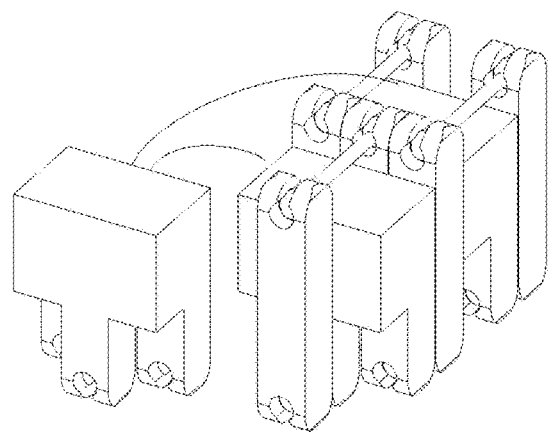
FIGS. 3d-3f show variants of the hinge according to the third embodiment.
Figure 3E:
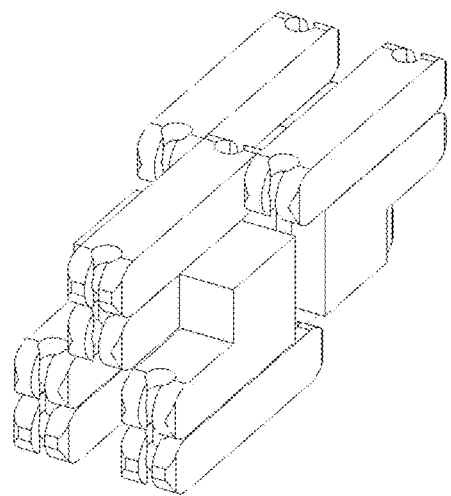
Figure 3F:
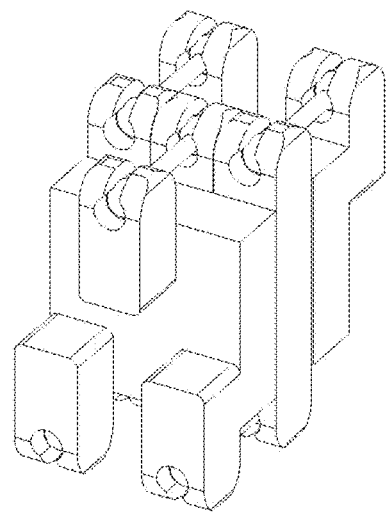

As shown in FIGS. 3*b* and 3*c*-0, vacant portions A are created in the body 102 of the first base element 11. The function of these vacant portions is to provide sufficient space for receiving the connection elements 21-23 during rotation of the hinge. Likewise, vacant portions are also formed in the body 106 of the second base element 12. FIGS. 3*d*-3*e* show an alternative design which uses links to form hinged connections. FIG. 3*f* shows a further variant.

Figure 4:
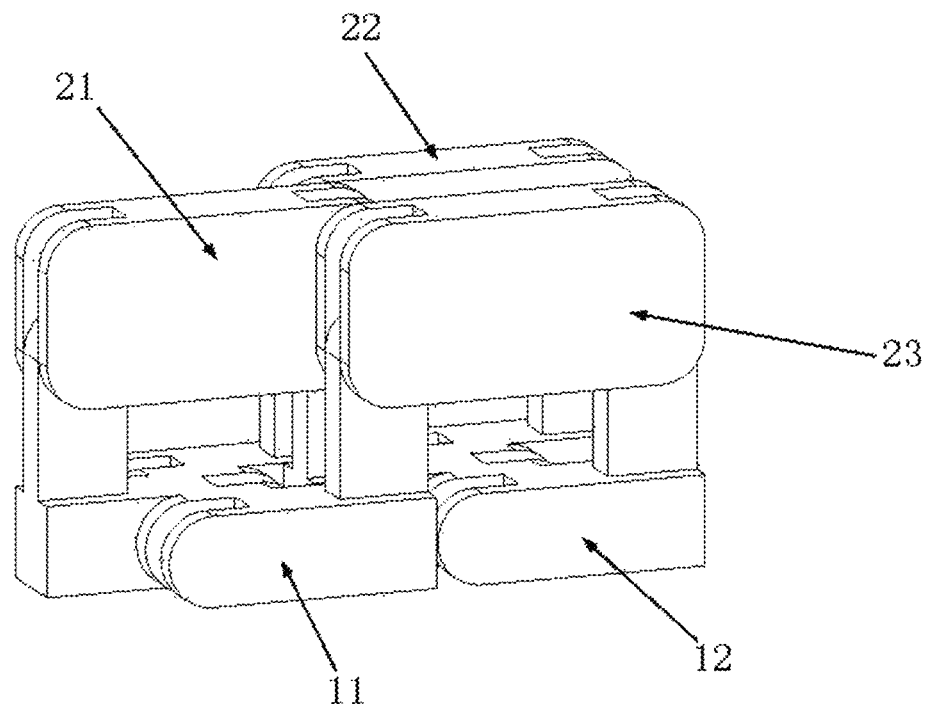
FIG. 4 shows a hinge according to a fourth embodiment of the invention.

FIG. 4 illustrates a hinge according to a fourth embodiment of the invention. A basic unit is used to explain the structure and connecting relationship of the hinge. The fourth embodiment is a variant of the first embodiment. The hinge in FIG. 4 comprises two base elements 11, 12 and three connection elements 21, 22, 23. The hinged connections between the base elements 11, 12 and the connection elements 21, 22, 23 are formed at a lower part of the ends of each connection element 21, 22, 23. FIG. 4 shows that the hinged connections are not limited to be located at the middle of the ends of each connection element.

Figure 5:
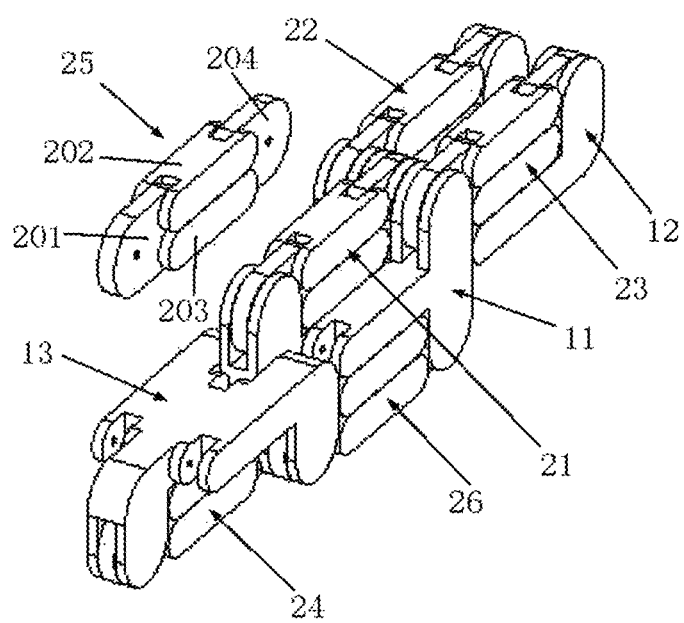
FIG. 5 shows a hinge according to a fifth embodiment of the invention.
Figures 1, 5:
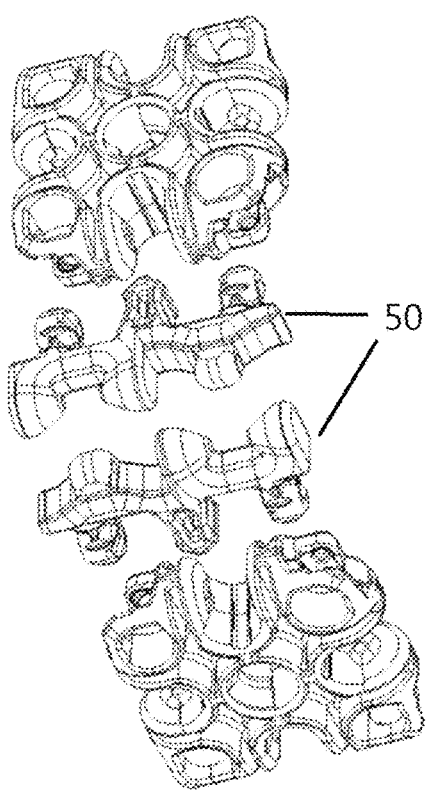
Figures 2, 5:
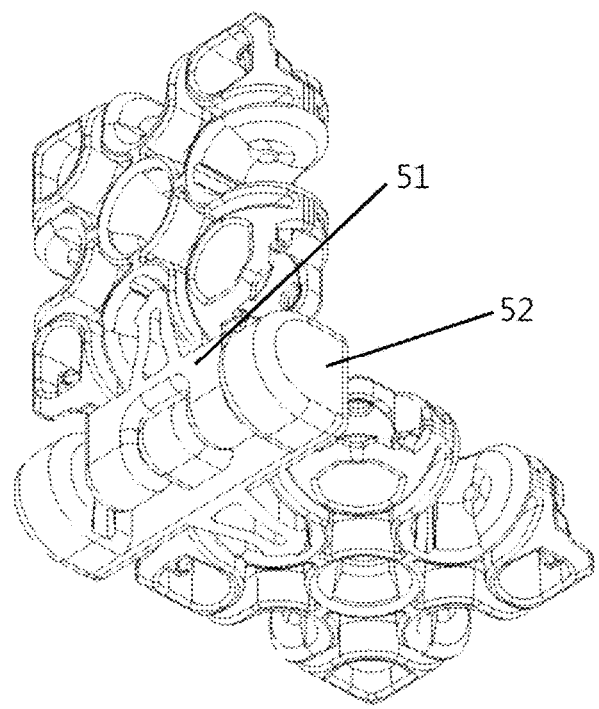
Figures 3, 5:
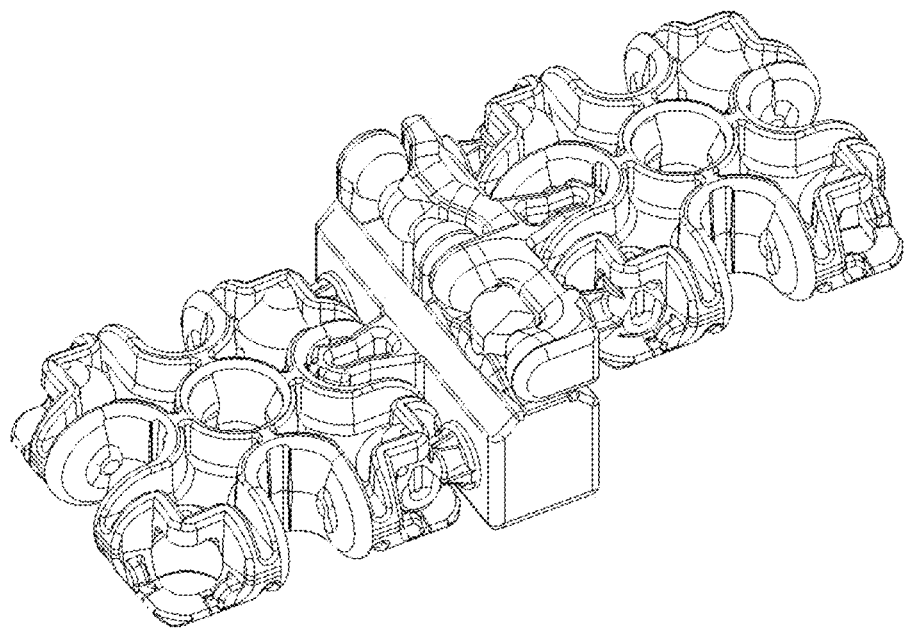
Figures 4, 5:
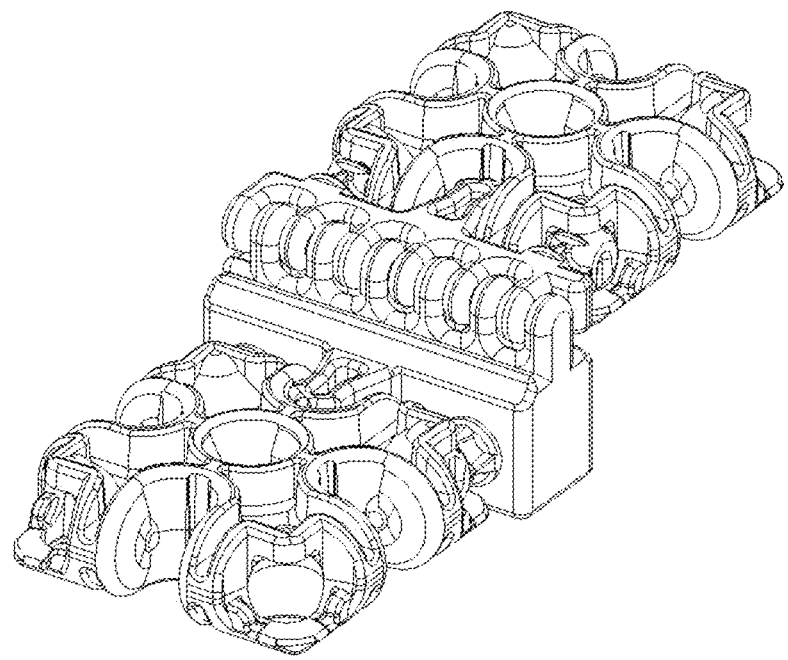
Figure 5:
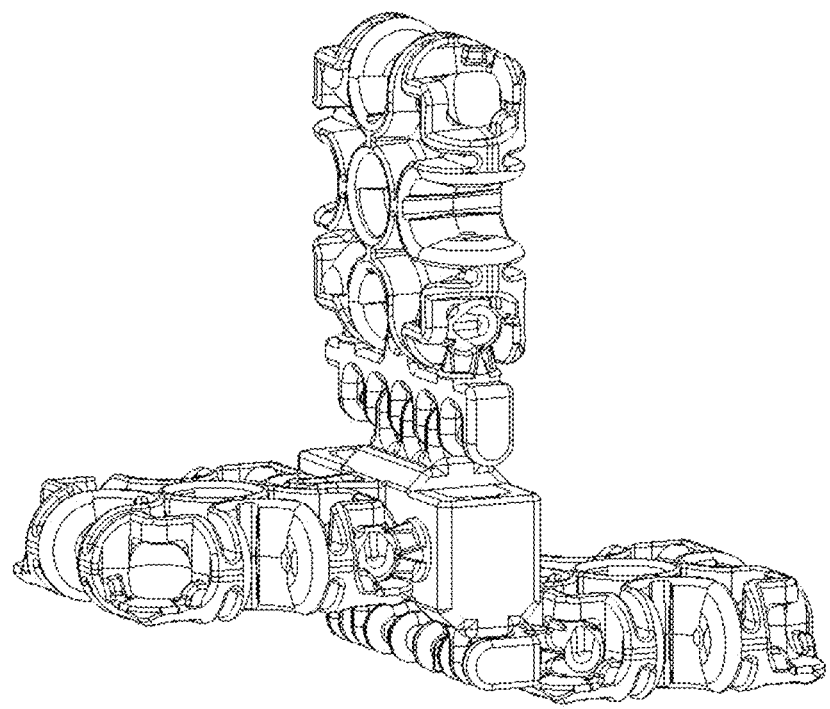
Figures 5, 6:
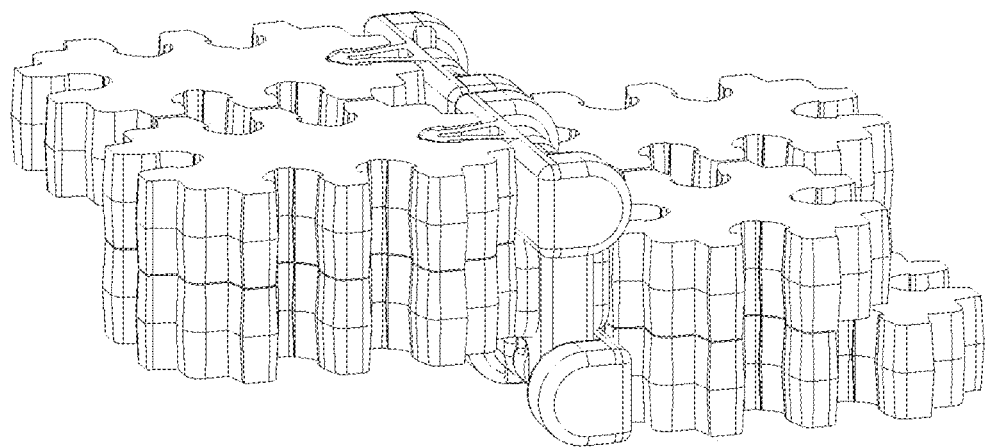
Figures 5, 6, 7:
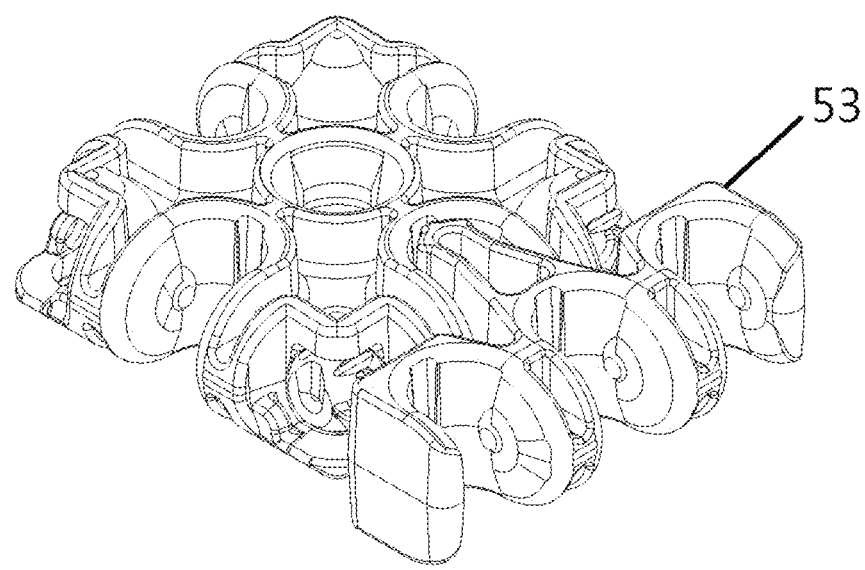
Figures 5, 6, 7, 8:
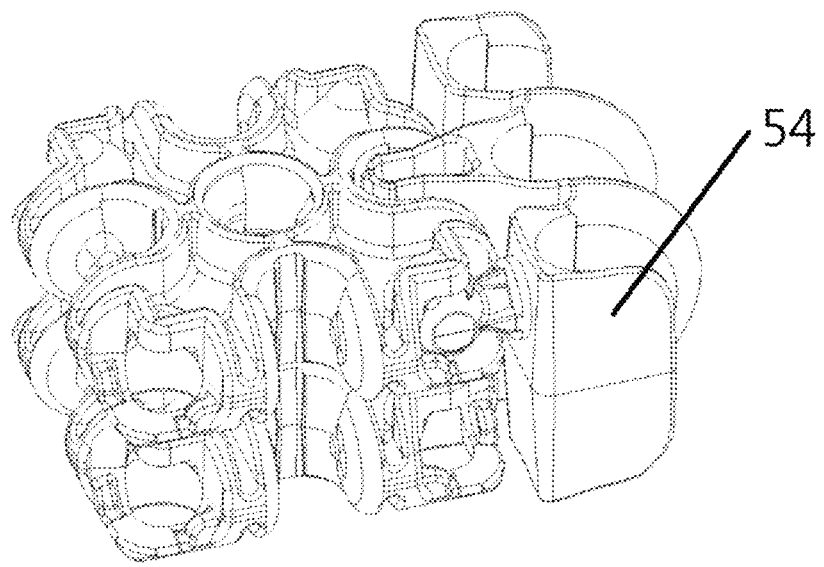

FIG. 5 illustrates a hinge according to a fifth embodiment of the invention. A basic unit is used to explain the structure and connecting relationship of the hinge. The fifth embodiment is a variant of the second embodiment. The hinge in FIG. 5 comprises three base elements 11-13 and six connection elements 21-26. In this embodiment, each connection element is formed by four parts. For easier understanding, the fifth connection element 25 is shown separately, which consists of four parts 201-204. The first base element 11 has both upward and downward extending portions for forming hinged connections. The second base element 12 has upward extending portions. And the third base element 13 has downward extending portions. The rest of structural features of the hinge in FIG. 5 are similar to those of the hinge in FIG. 2 and are thus omitted here in the interest of brevity.

In the fifth embodiment, parts 202, 203 function as the connection elements of the hinge in FIG. 1. Parts 201, 204 are used to extend the parts 202, 203 in the forward-rearward direction and thus are called "body extensions". A body extension can connect to one or more elements (base elements and/or connection elements) so as to make the extended elements suitable for assembly. For example, a body extension may be connected to a multi-layer element to form different products. A body extension may be connected to a base element to provide a projected portion or a recessed portion. A body extension may be directly or indirectly connected to a base element, a connection element, or another body extension. The connection element 25 shown in FIG. 5 has a double-layer structure. In one application, the two layers of the connection element can be used to hold an article being displayed such as a card. In another application, each layer is made of a different material or has a different color.

The body extensions shown in FIGS. 5-1 to 5-6 can be directly connected to the base elements or connection elements. The body extensions shown in FIGS. 5-7 to 5-12 are connected to the elements by means of links. FIG. 5-1 shows two identical body extensions 50 in the assembly. FIG. 5-2 shows two different body extensions 51, 52 in the assembly. FIG. 5-3 shows two different body extensions in the assembly so that the right element can be rotated anticlockwise onto the left element. FIG. 5-4 shows a different design which achieves the same function. The body extension in FIG. 5-5 can be connected to elements at the upper, left and lower sides. The body extension in FIG. 5-6 can be connected to elements at the left and lower sides. FIG. 5-6 shows the body extension incorporated into the third embodiment to form one of the three segments of the hinge shown in FIG. 3c-0. FIG. 5-7 shows a single-layer body extension 53. FIG. 5-8 shows a double-layer body extension 54. FIG. 5-9 shows double-layer body extensions incorporated into the first embodiment. FIG. 5-10 shows a part of the hinge in FIG. 5-9. FIG. 5-11 shows another single-layer body extension. FIG. 5-12 shows a single-layer body connected to a triangular element.

FIG. 6 illustrates a hinge according to a sixth embodiment of the invention. A basic unit is used to explain the structure and connection of the hinge. In this embodiment, two base elements 11, 12 and two connection elements 21, 22 are shown. The shapes of the first base element 11 and the second base element 12 can be identical or different. Each of the base elements 11, 12 has a projected portion at one end and a recessed portion at the other end. When the hinge is in the first combination state, the projected portion of the second base element 12 is received in the recess portion of the first base element 11. As mentioned previously, the shapes of the projected portion and the recess portion may not perfectly match with each other. In this embodiment, the first end of the first connection element 21 and the first base element 11 form a first hinged connection about a first rotational axis 301. The second end of the first connection element 21 and the second base element 12 form a second hinged connection about a second rotational axis 302. Likewise, the first end of the second connection element 22 and the first base element 11 form a third hinged connection about a third rotational axis 303. The second end of the second connection element 22 and the second base element 12 form a fourth hinged connection about a fourth rotational axis 304. When the hinge is in the first combination state, as shown in FIG. 6, the first and second base elements 11, 12 are coplanar and the second and third rotational axes 302, 303 are coaxial. The hinge is brought into a second combination state after a 180-degree clockwise rotation of the first base element 11 about the second rotational axis 302 (or a 180-degree anticlockwise rotation of the second base element 12 about the third rotational axis 303). When the hinge is in the second combination state (not shown), the first and fourth rotational axes 301, 304 are coaxial, and the first and second connection elements 21, 22 are arranged side by side. The heights of the first and second base elements 11, 12 are much larger than those of the first and second connection elements 21, 22. It should be understood that the heights of the first and second base elements 11, 12 do not affect the movement of the hinge. Accordingly, both the base elements and the connection elements of the hinge unit may have any desired heights.

Figure 7A:
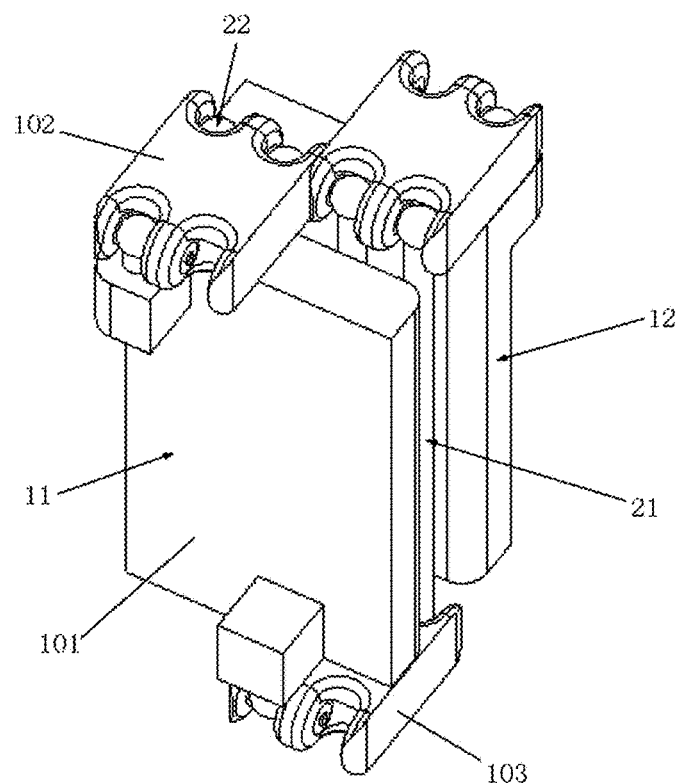
FIGS. 7a-7c show hinges according to a seventh embodiment of the invention.

FIG. 7a illustrates a hinge according to a seventh embodiment of the invention. A basic unit is used to explain the structure and connection of the hinge. The seventh embodiment is a modification of the sixth embodiment. The hinge comprises two base elements 11, 12 and two connection elements 21, 22. Each of the base elements 11, 12 consists of a number of parts. The first base element 11 is formed by a body 101 and the upper and lower auxiliary parts 102, 103 hingedly connected to the upper and lower ends of the body 101. FIG. 7a shows the hinge in the first combination state. The connection elements 21, 22 each include two links for connecting the base elements 11, 12 together. Similar to the third embodiment, the base elements 11, 12 are each formed by hingedly connected parts. As a result, the first base element 11, as a whole, can be rotated 180 degrees clockwise. Then the body 101 of the first base element 11 can be rotated 180 degrees about the rotational axis in the upper part of hinge in FIG. 7a.

Figure 7B:
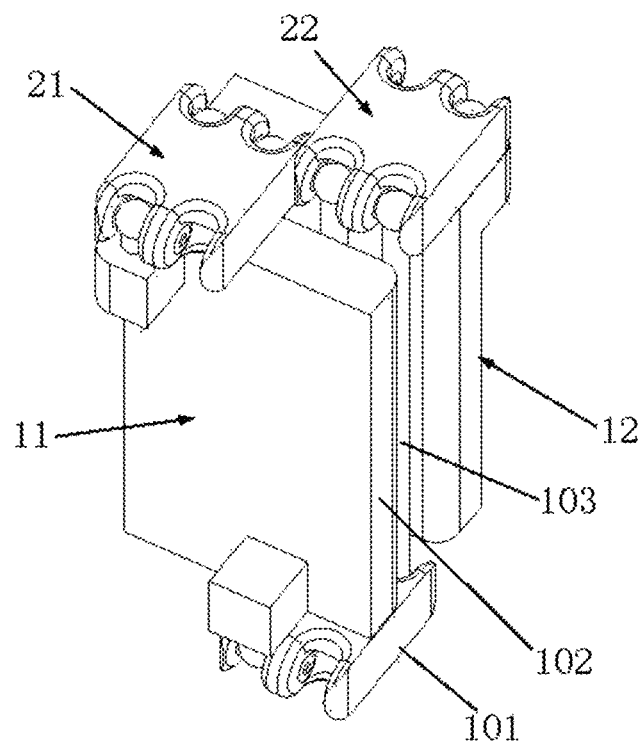

The hinge in FIG. 7b shares the same structure as that in FIG. 7a. The difference is that, in FIG. 7b, two parts at the top form the first and second connection elements 21, 22. The body 102, lower part 101 and links 103 together form the first base element 11. The remaining parts form the second base element 12.

Figure 7C:
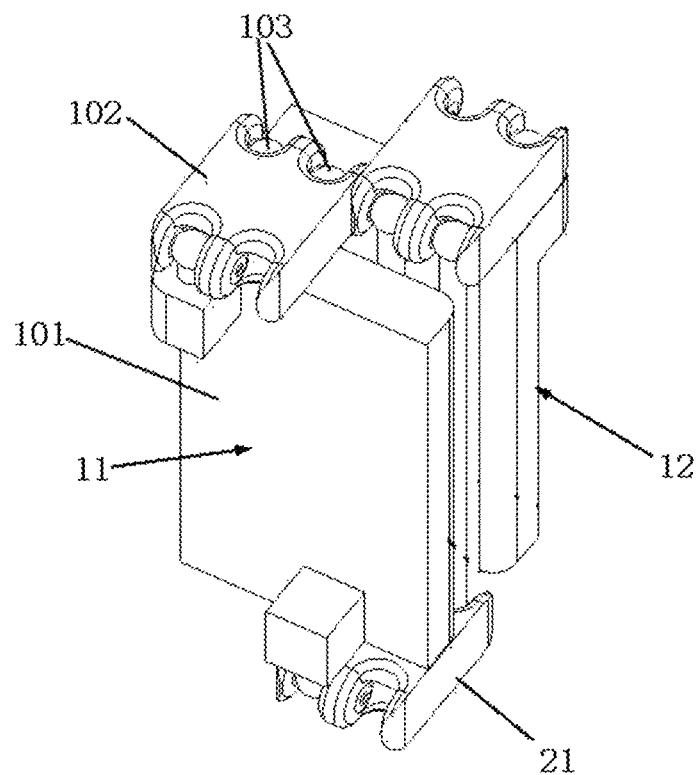

The hinge in FIG. 7c shares the same structure as that in FIG. 7a. The difference is that, in FIG. 7c, two parts at the bottom form the first and second connection elements 21, 22. The body 101, upper part 102 and links 103 together form the first base element 11. The remaining parts form the second base element 12.

Figure 8:
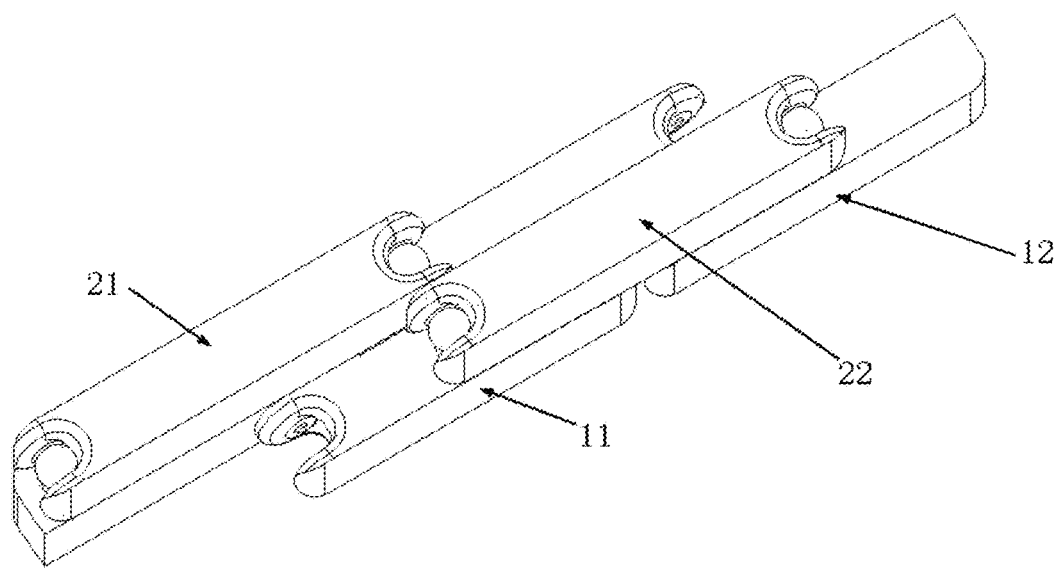
Figure 8A:
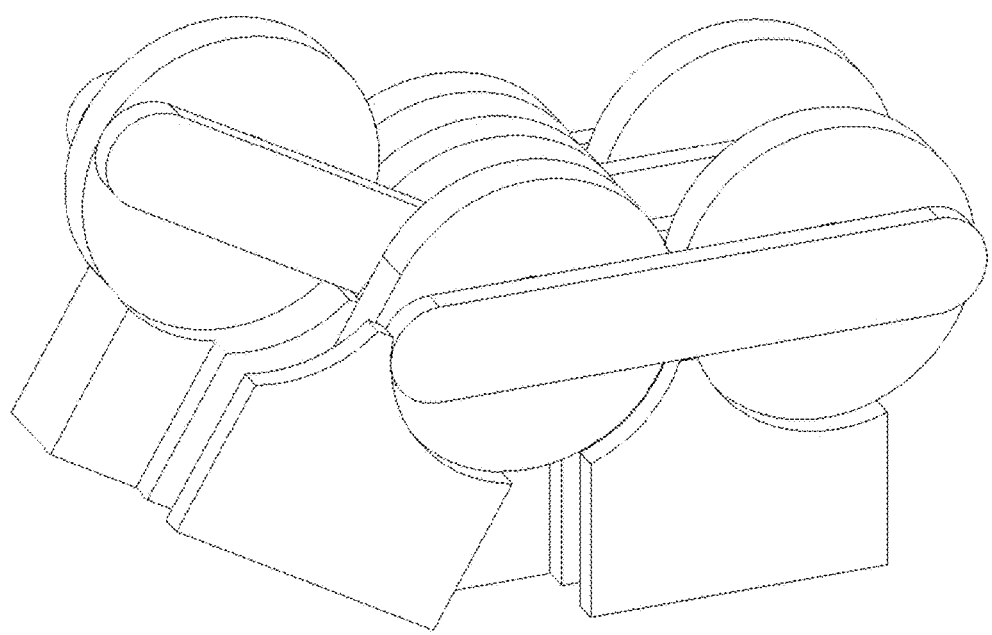
Figure 9:
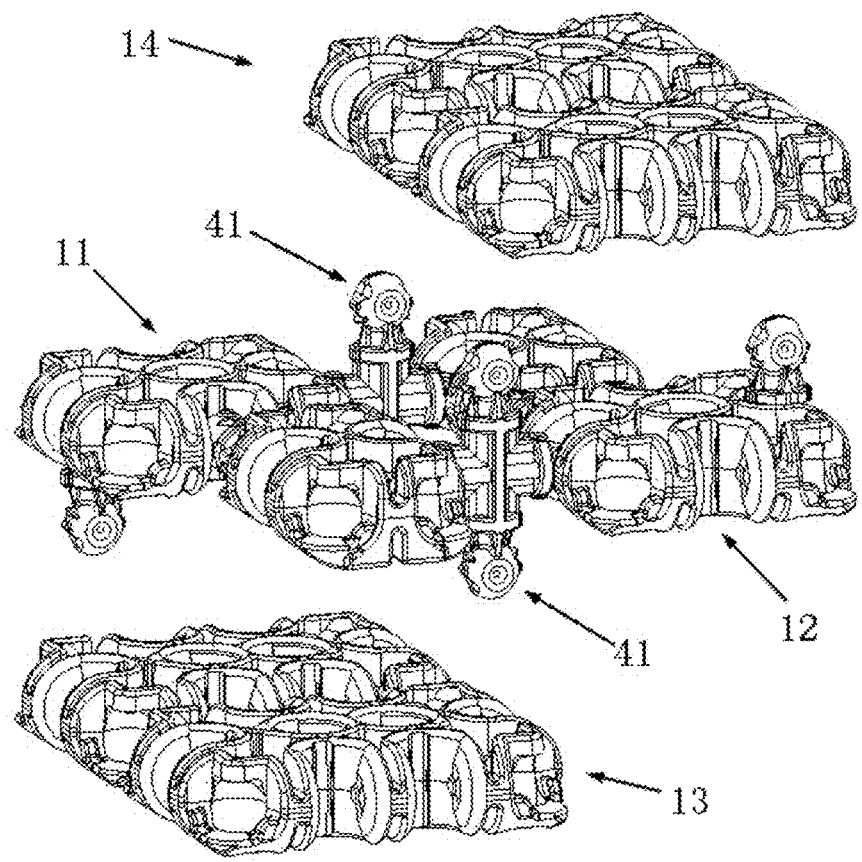
Figure 10:
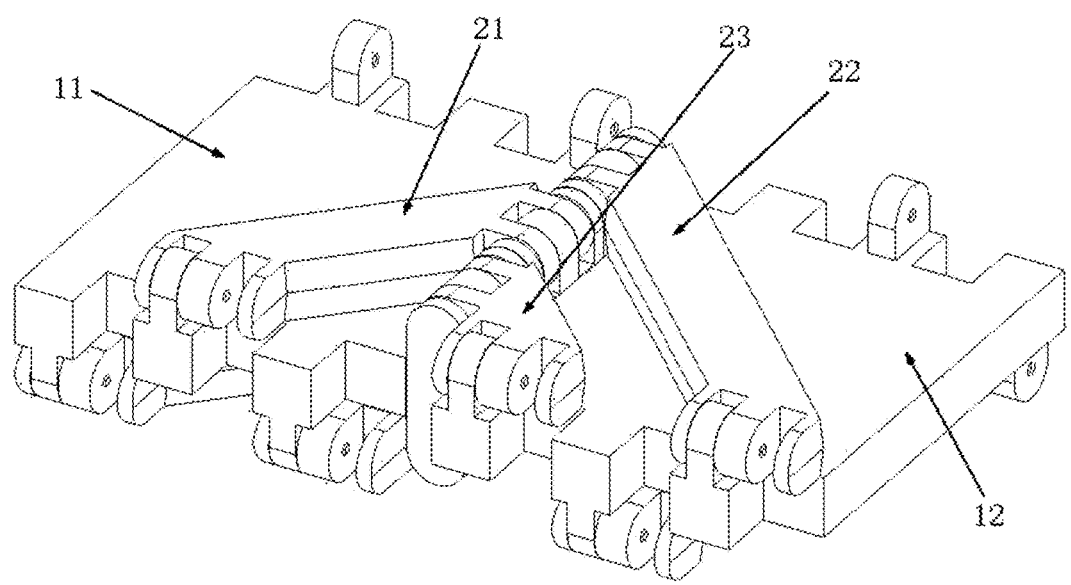
Figure 11:
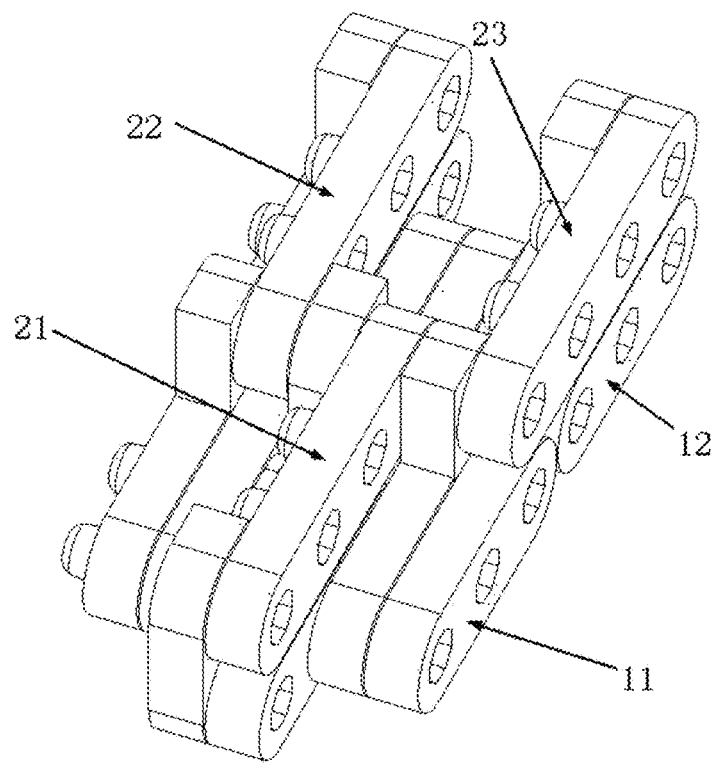

FIG. 8 illustrates a hinge according to an eighth embodiment of the invention. A basic unit is used to explain the structure and connection of the hinge. The eighth embodiment is a variant of the sixth embodiment. The hinge comprises two base elements 11, 12 and two connection elements 21, 22. The third and fourth hinged connections between the second connection element 22 and the first and second base elements 11, 12 are located at the middle portions of the first and second base elements 11, 12 rather than at the ends. FIG. 8a shows that the joint regions between connection elements and base elements are not limited to the ends of the connection elements.

Figures 5, 6, 7, 8, 9:
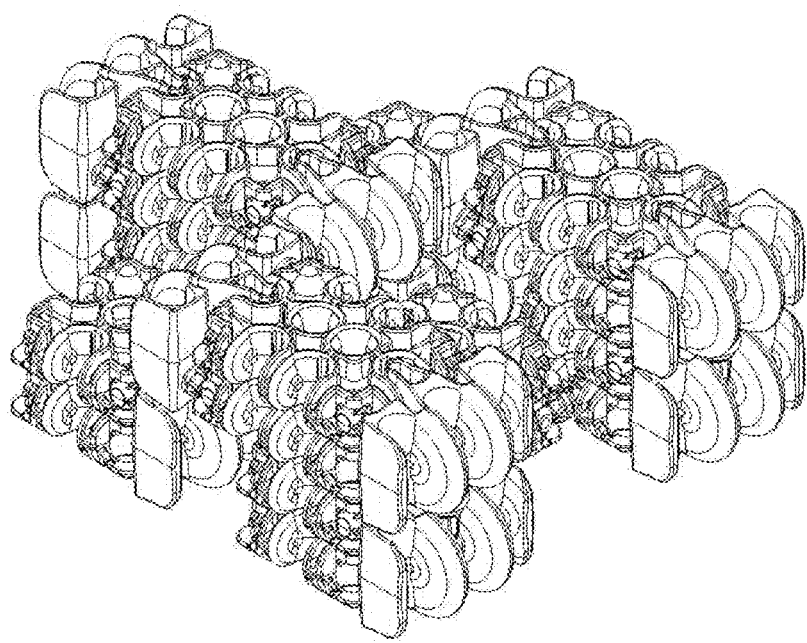

FIG. 9 illustrates a hinge according to a ninth embodiment of the invention. A basic unit is used to explain the structure and connection of the hinge. The ninth embodiment is a modification of the seventh embodiment. The hinge in FIG. 9 has a similar structure as that shown in the right half of the hinge in FIG. 7a, but uses a cross-shaped link 41 to replace the connection element 21 in FIG. 7a. A first base element 11 in a middle layer connects to a third base element 13 in a lower layer. Then the third base element 13 connects to a fourth base element 14 in an upper layer via the cross-shaped link 41. Finally, the fourth base element 14 connects to a second base element 12 in the middle layer. The structure of the left half of the hinge is the opposite. In this embodiment, the cross-shaped link 41 temporarily holds the positions of the two base elements 11, 12, and upon rotation, the first and second base elements 11, 12 will be disconnected from the cross-shaped link 41. However, the cross-shaped link 41 is always connected to the third and fourth base elements 13, 14 upon rotation. The cross-shaped link 41 is important as it allows connection with four base elements at the same time. The use of link 41 expands the application of the hinge according to the invention.

Figures 5, 6, 7, 8, 9, 10:
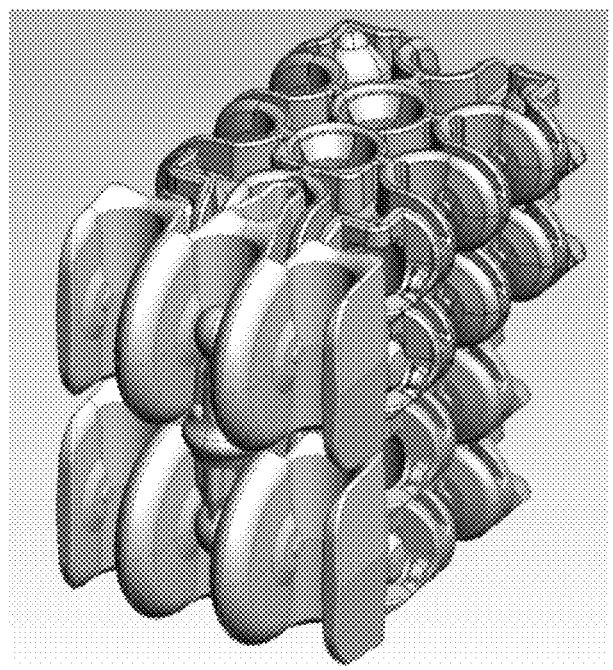

FIG. 10 illustrates a hinge according to a tenth embodiment of the invention. A basic unit is used to explain the structure and connection of the hinge. The tenth embodiment is a variant of the second embodiment. The hinge comprises two base elements 11, 12 and three connection elements 21, 22, 23. This embodiment shows that base elements and connection elements do not have to be in a parallel or perpendicular relation. The connection elements may be angled with respect to each other. And the shapes of the connection elements may differ.

Figures 5, 6, 7, 8, 9, 10, 11:
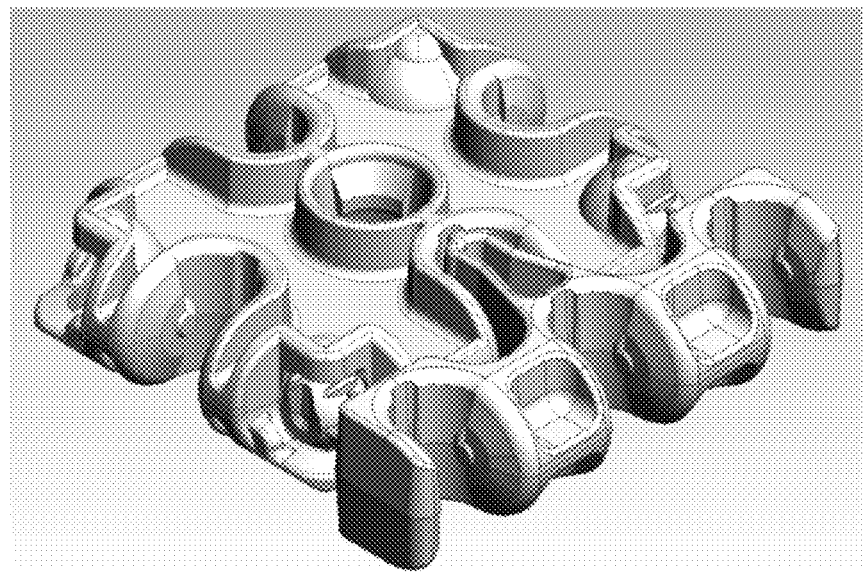

FIG. 11 illustrates a hinge according to an eleventh embodiment of the invention. A basic unit is used to explain the structure and connection of the hinge. The eleventh embodiment is a variant of the first embodiment. The hinge comprises two base elements 11, 12 and three connection elements 21, 22, 23. Each of the two base elements 11, 12 is constructed by a number of building blocks with simple shapes. The connections between the base elements and the connection elements are similar to those in the first embodiment and thus are omitted.

Figures 5, 6, 7, 8, 9, 10, 11, 12:
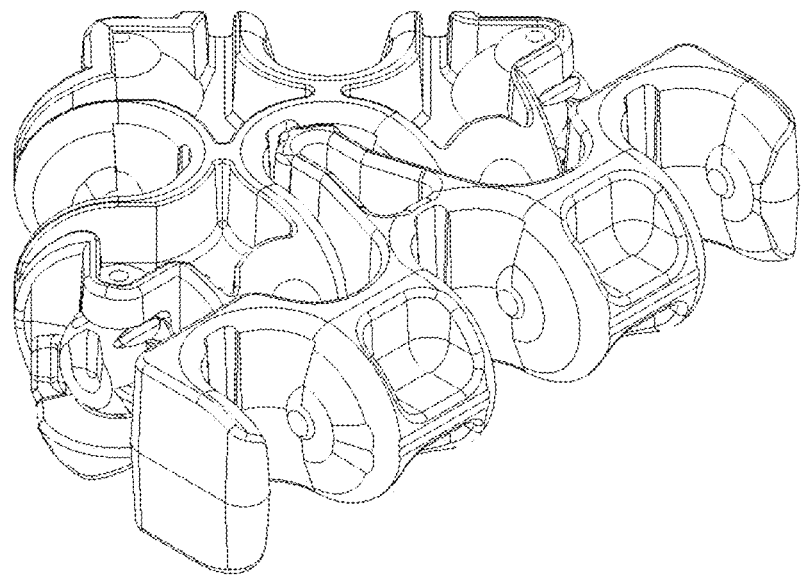
Figure 6:
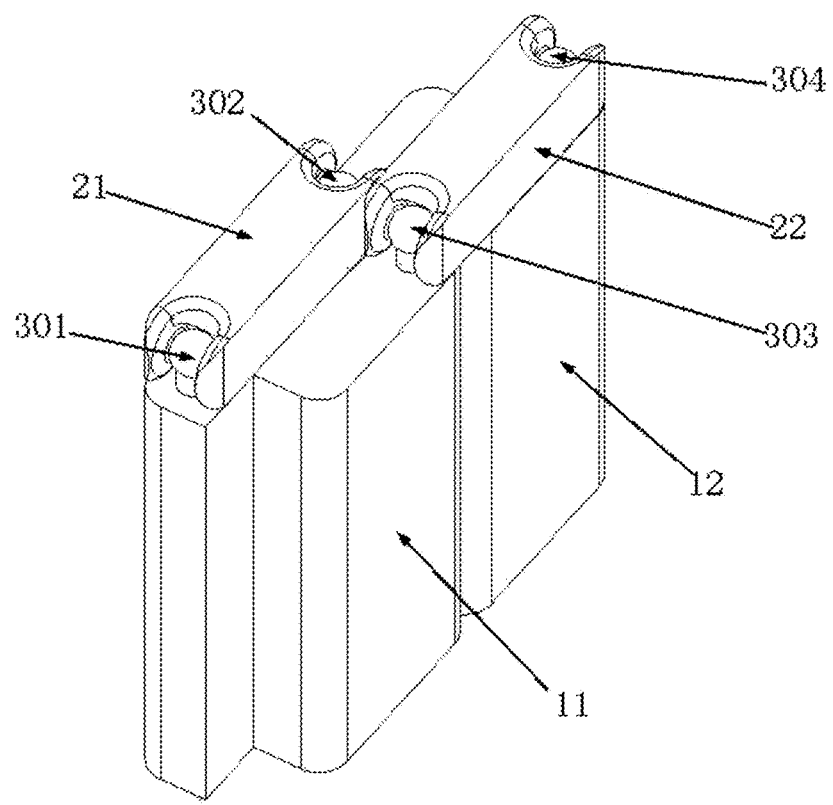
Figure 12:
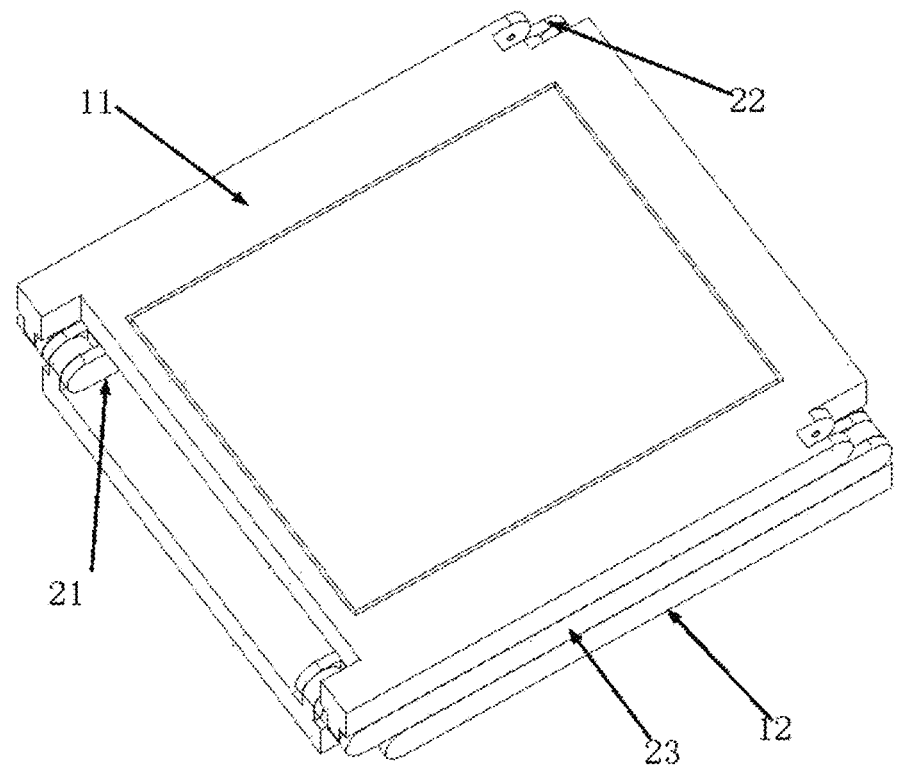
Figure 12A:
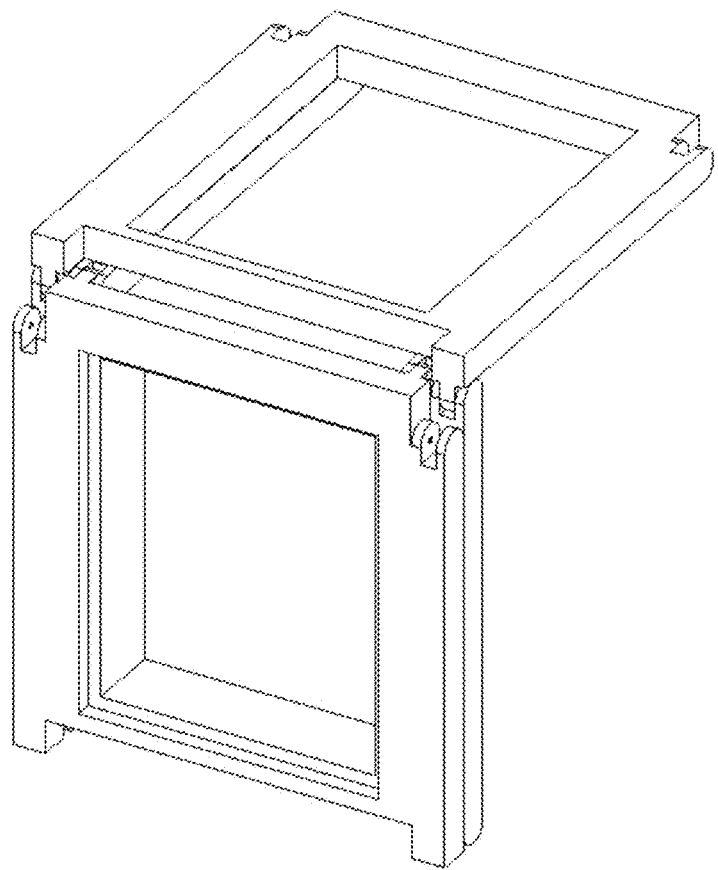
Figure 12B:
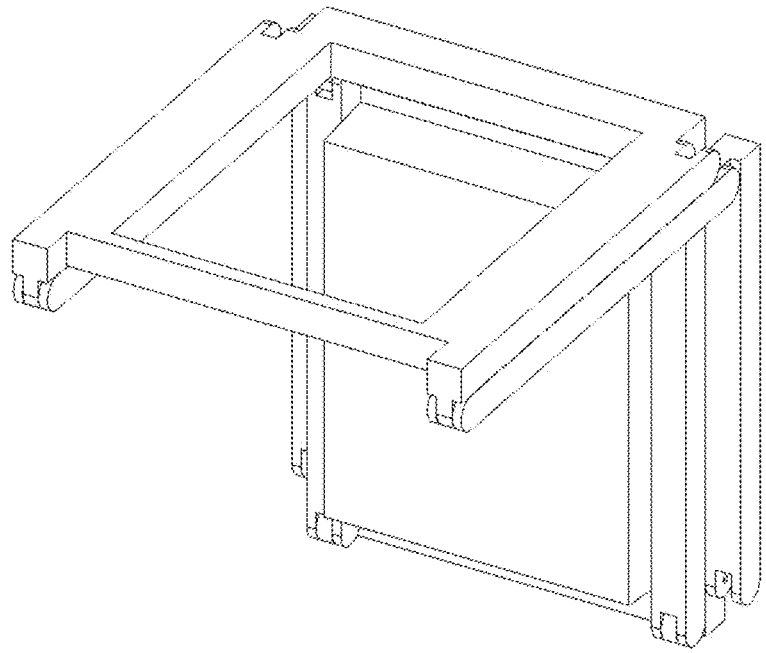
Figure 12C:
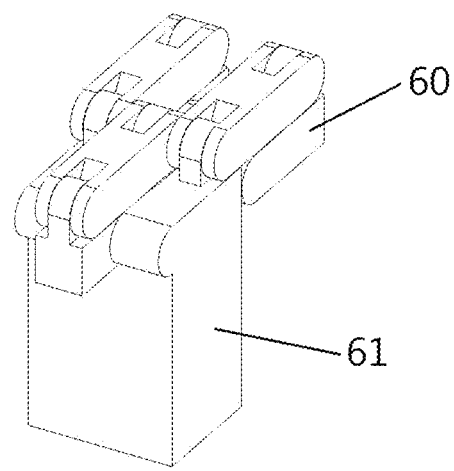
Figure 12D:
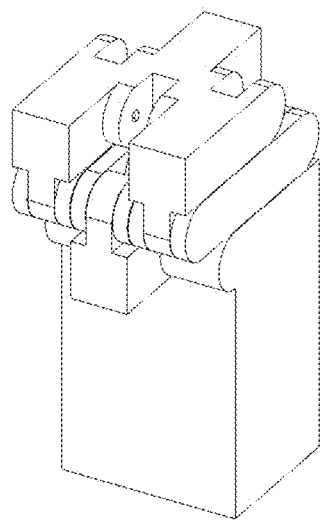

FIG. 12 illustrates a hinge according to a twelfth embodiment of the invention. A basic unit is used to explain the structure and connection of the hinge. The twelfth embodiment is a variant of the first embodiment. The hinge comprises two base elements 11, 12 and three connection elements 21, 22, 23. The first base element 11 is embodied as a door frame and the second base element 12 forms a door. FIG. 12 shows the door assembly in the second combination state. The connections between the base elements and the connection elements are similar to those in the first embodiment. FIG. 12a shows that the door is being opened in the clockwise direction. FIG. 12b, on the other hand, shows the door being opened in the anticlockwise direction.

Figure 12E:
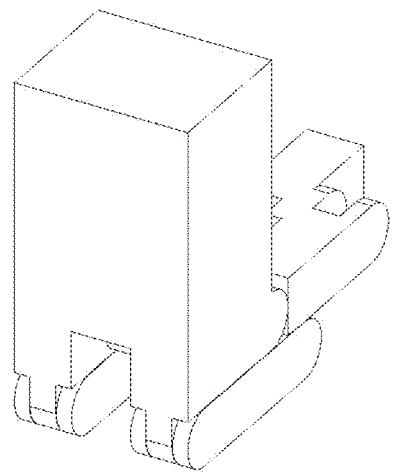
Figure 12F:
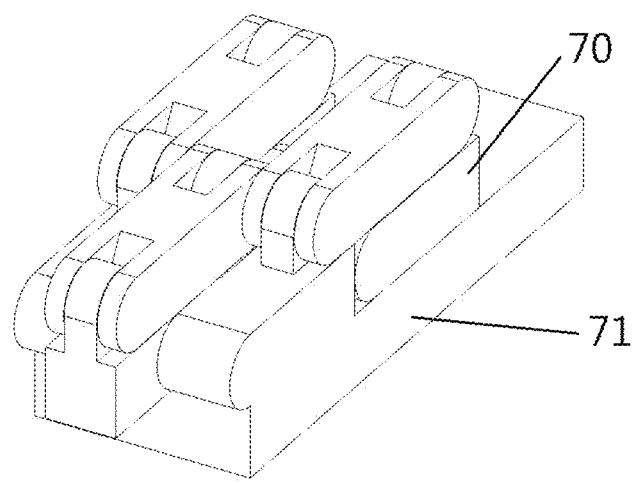
Figure 12G:
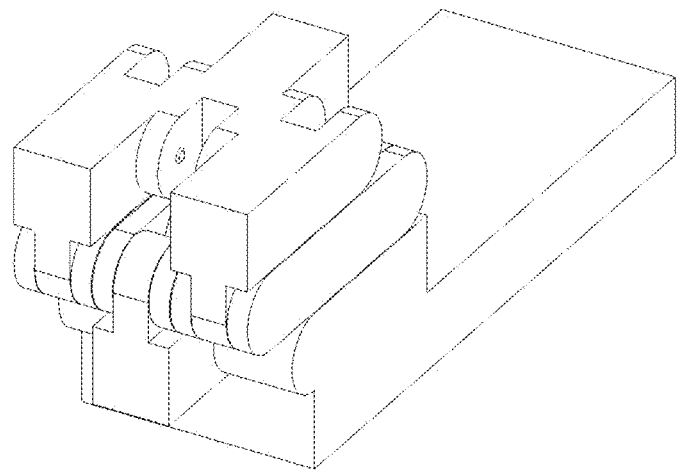
Figure 12H:
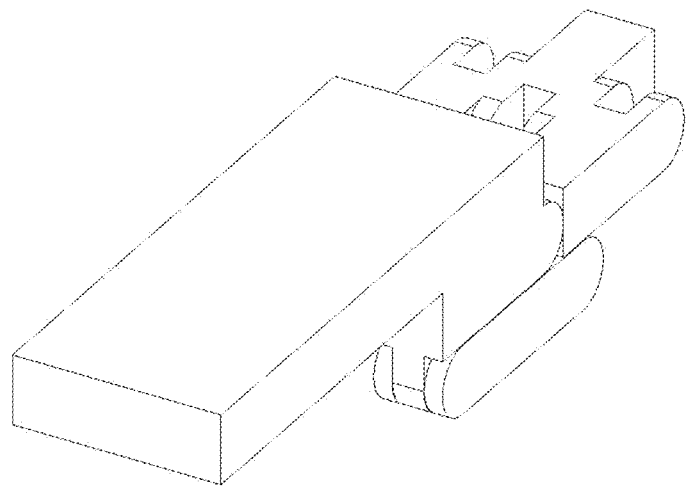
Figure 12I:
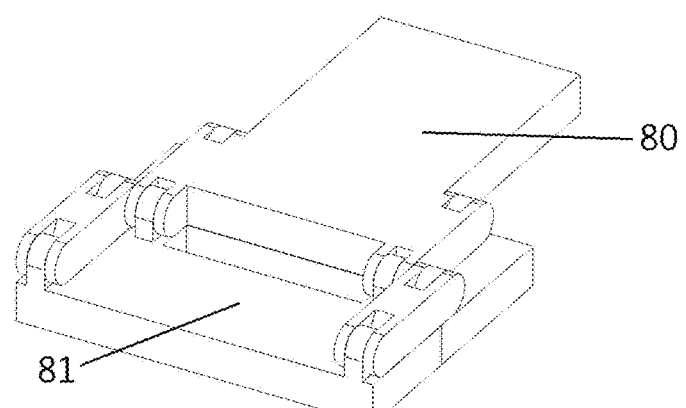
Figure 12J:
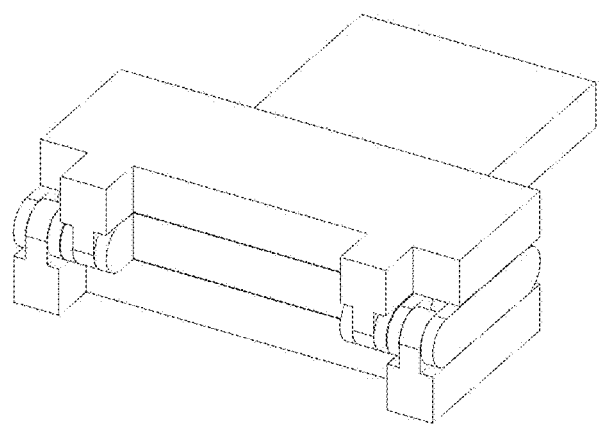
Figure 12K:
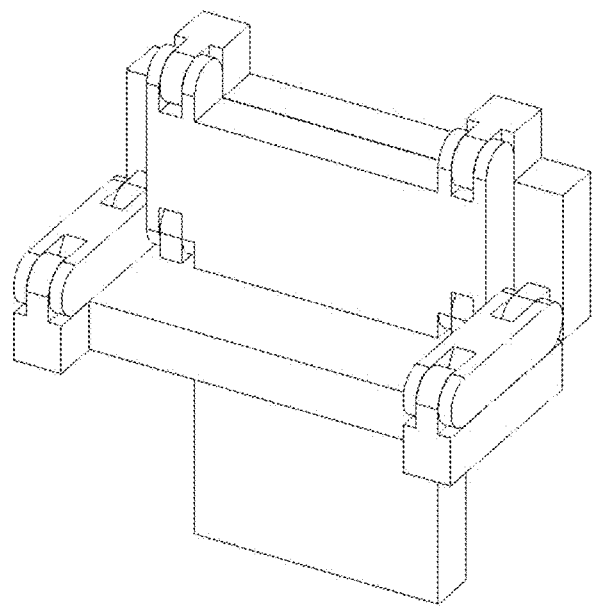

FIGS. 12c-12k illustrate further embodiments in which the hinge is designed as a door and frame assembly. In the embodiments shown in FIGS. 12c-12e, the second base element functions as a locking device 60 of a door, and the first base element extending downward for a certain distance to form the door 61. After the locking device has been rotated 180 degrees anticlockwise to reach the state in FIG. 12d, the door 61 can be opened. FIG. 12e shows the door being opened after a 180-degree clockwise rotation. It is understood that FIGS. 12c-12e respectively correspond to the locking state, unlocking state and open state of the door. FIGS. 12f-12h illustrate another design in which the second base element functions as a locking device 70 of a door, and the first base element extending horizontally for a certain distance to form the door 71. FIGS. 12f-12h respectively correspond to the locking state, unlocking state and open state of the door. In the embodiment shown in FIGS. 12i-12k, a connection element forms a door 80 and a base element functions as a locking device 81 of the door. FIGS. 12i-12k respectively correspond to the locking state, unlocking state and open state of the door.

FIG. 13 illustrates a hinge according to a thirteenth embodiment of the invention. A basic unit is used to explain the structure and connection of the hinge. The thirteenth embodiment is a variant of the first embodiment. The hinge comprises two base elements 11, 12 and three connection elements 21, 22, 23. The hinge forms a box which can be opened and locked. The connections between the base elements and the connection elements are similar to those in the first embodiment. FIG. 13a shows the state of the box after the first base element 11 has been rotated 180 degrees clockwise. In this state, the first connection element 21 is inverted between the second and third connection elements 22, 23. FIG. 13b shows the state of the box after the first base element 11 has been rotated clockwise by another 180 degrees. In one application, the first connection element 21 is made of a transparent material so as to display and protect an article therein.

Figure 13C:
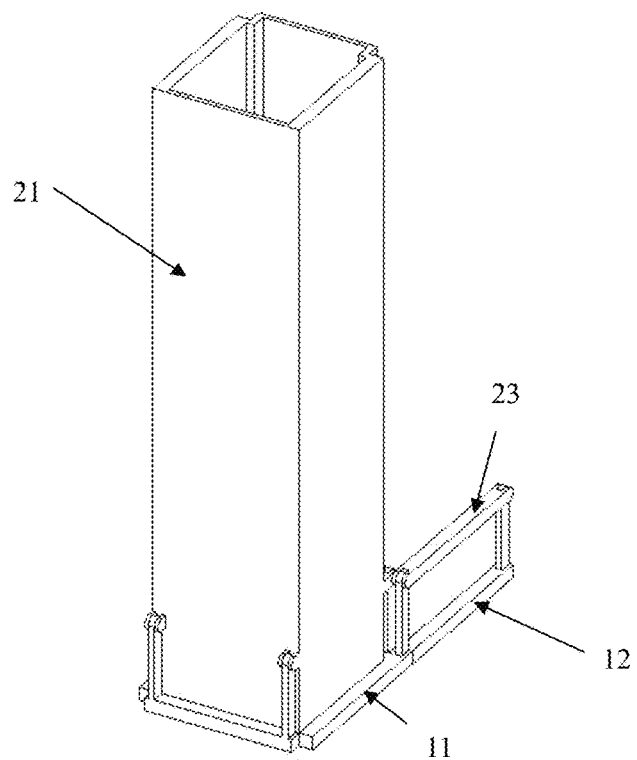
FIGS. 13-13e show hinges according to a thirteenth embodiment of the invention.
Figure 13D:
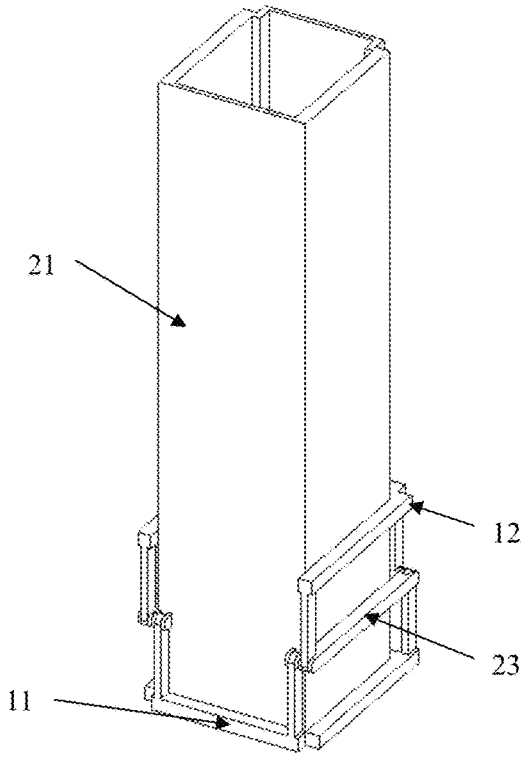
Figure 13E:
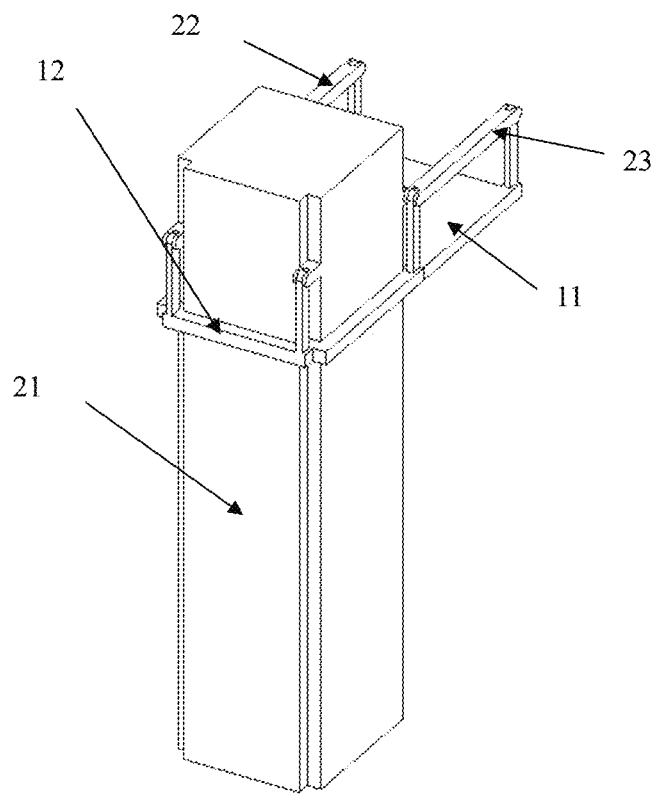

The embodiment in FIG. 13c increases the height of connection element 21. The second base element 12 forms a frame with an opening for receiving the first connection element 21. The second base element 12, together with the second and third connection elements 22, 23, rotates 180 degrees anticlockwise to reach the state in FIG. 13d. Then the first connection element 21, together with the second base element 12, rotates 180 degrees anticlockwise to reach the state in FIG. 13e.

Figure 14:
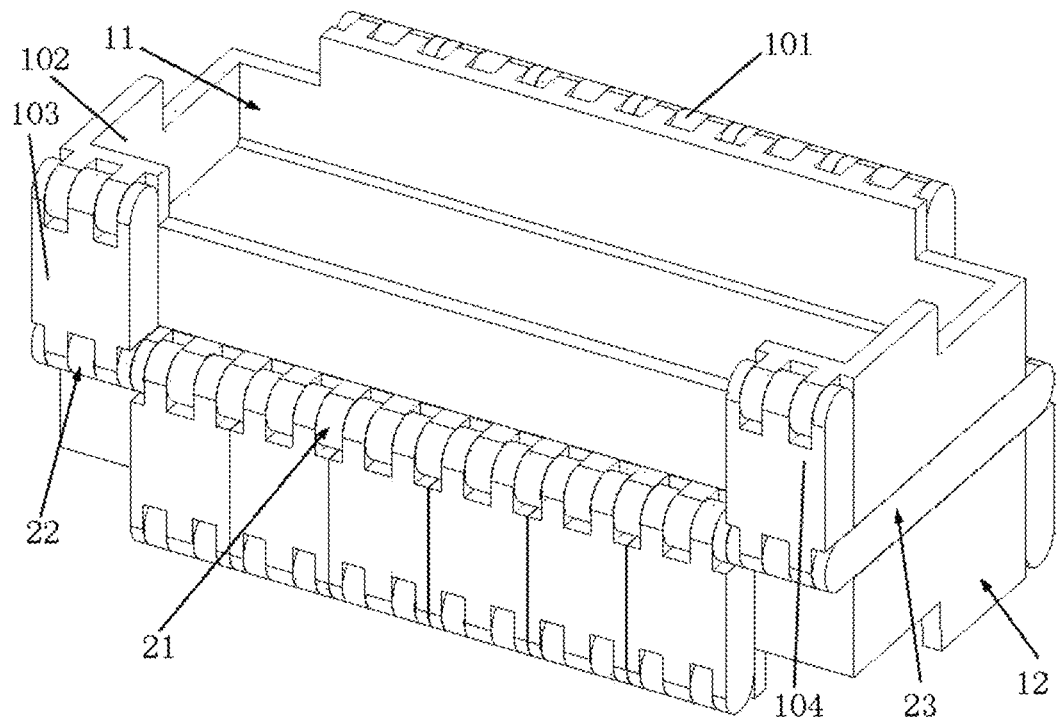
FIG. 14 shows a hinge according to a fourteenth embodiment of the invention.

FIG. 14 illustrates a hinge according to a fourteenth embodiment of the invention. A basic unit is used to explain the structure and connection of the hinge. The fourteenth embodiment is a variant of the third embodiment. In this embodiment, the hinge comprises two base elements 11, 12 and three connection elements 21, 22, 23. Each of the base elements 11, 12 is formed by a number of parts. The first base element 11 is formed by a body 102 and three auxiliary parts 101, 103, 104. Different from the third embodiment, the body 102 is configured as a box-shaped member so that the hinge can be used as a box. The auxiliary part 101 is formed by a row of the auxiliary part 101 in FIG. 3 to provide the required width of the box. The connections between base elements and connection elements are similar to those in the third embodiment.

Figure 15:
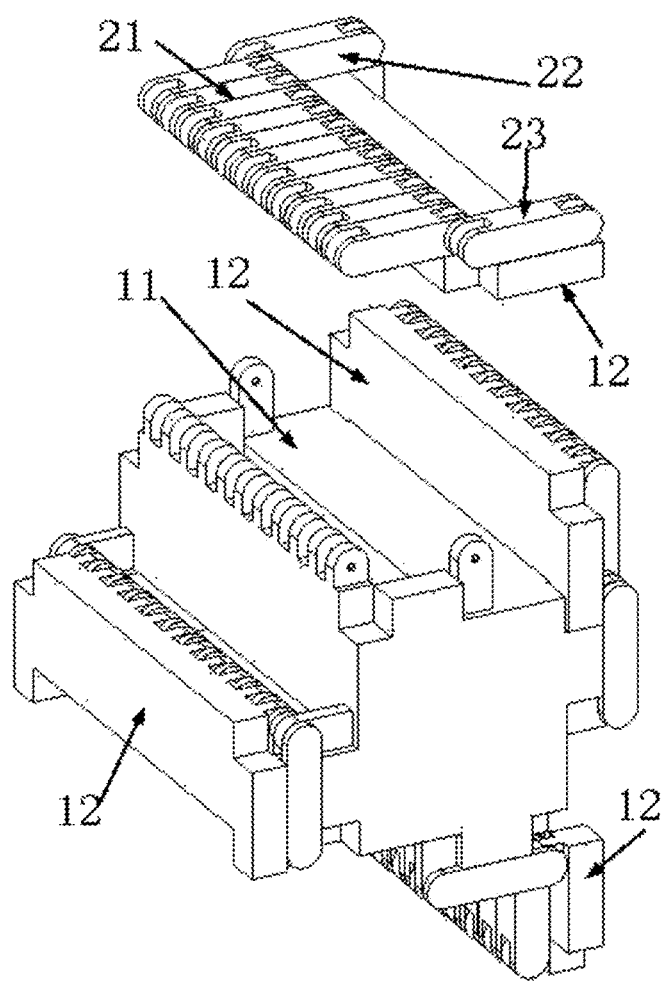
FIGS. 15-15d show a hinge according to a fifteenth embodiment of the invention.

FIG. 15 illustrates a hinge according to a fifteenth embodiment of the invention. A basic unit is used to explain the structure and connection of the hinge. The hinge comprises a first base element 11 and four second base elements 12 each of which is connected to the first base element 11 by a set of connection elements 21, 22, 23. Each of the four faces of the first base element 11 forms a hinge unit with a corresponding second base element 12 and a set of connection elements 21, 22, 23. Each hinge unit is designed to have a box-shaped structure. For easier understanding, the upper second base element 12 and the associated connection elements 21, 22, 23 are shown separately. In FIG. 15, the upper box is in a closed and locked state, the right box is in a fully opened state, the lower box is in a partially opened state, and the left box is in a closed and unlocked state.

Figure 15A:
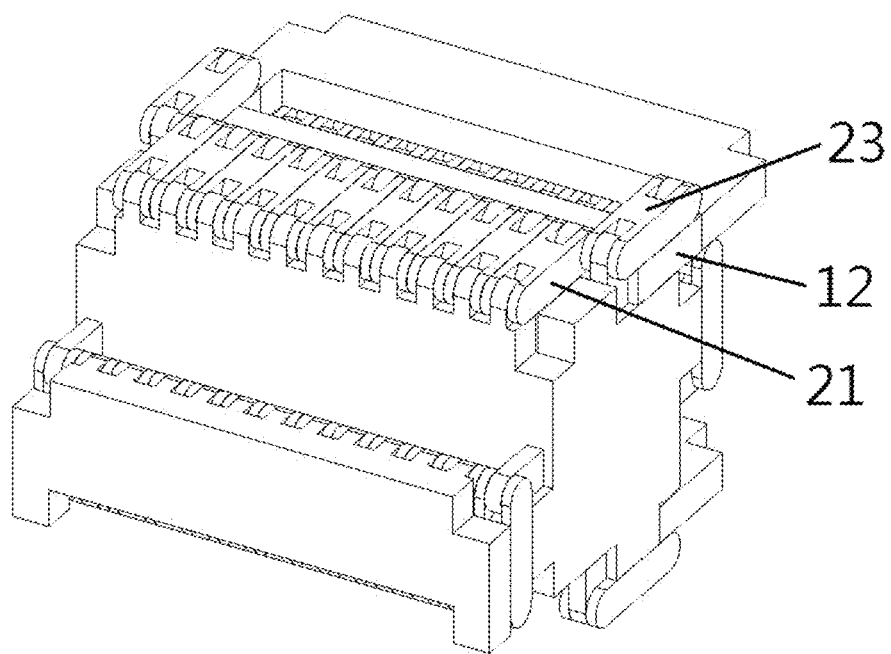
Figure 15B:
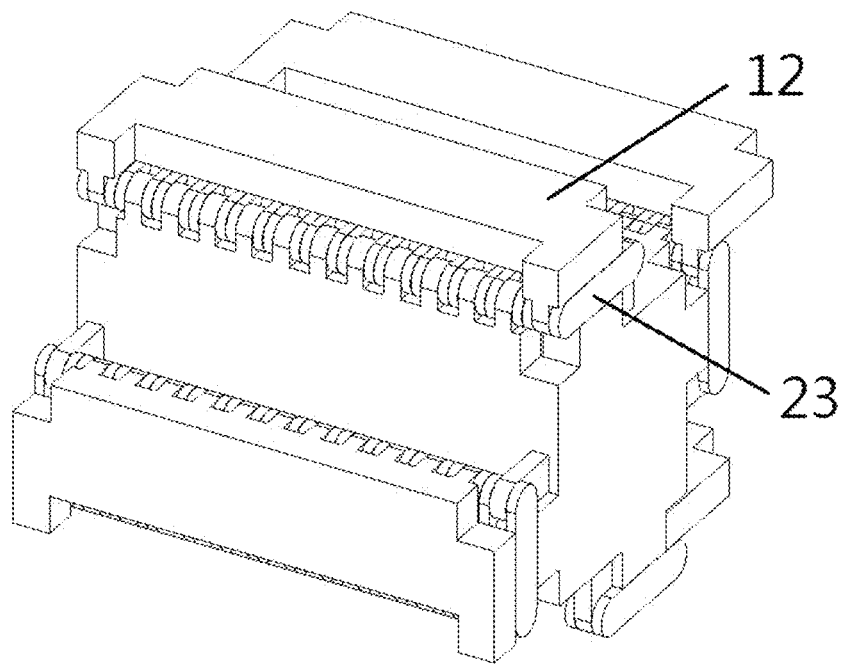
Figure 15C:
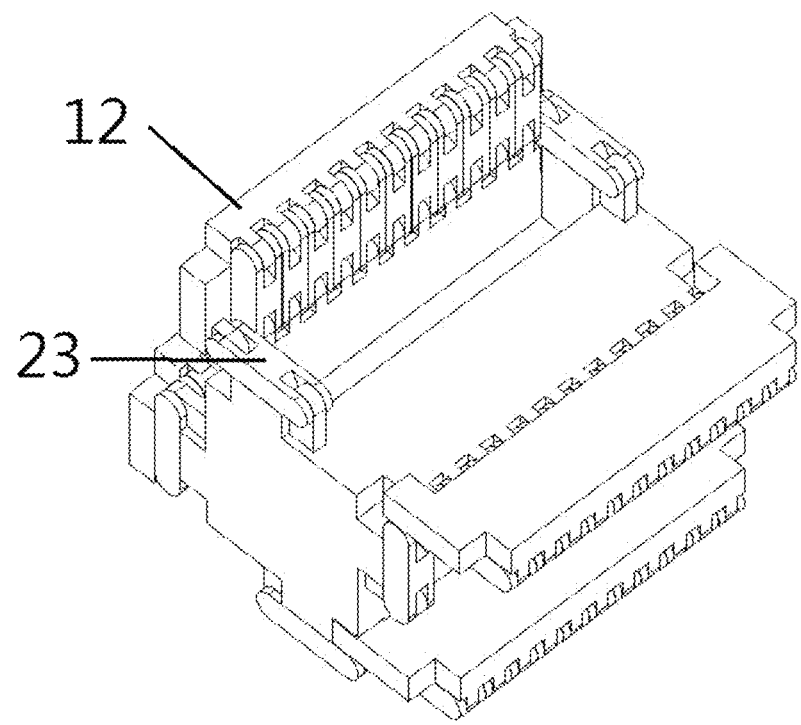
Figure 15D:
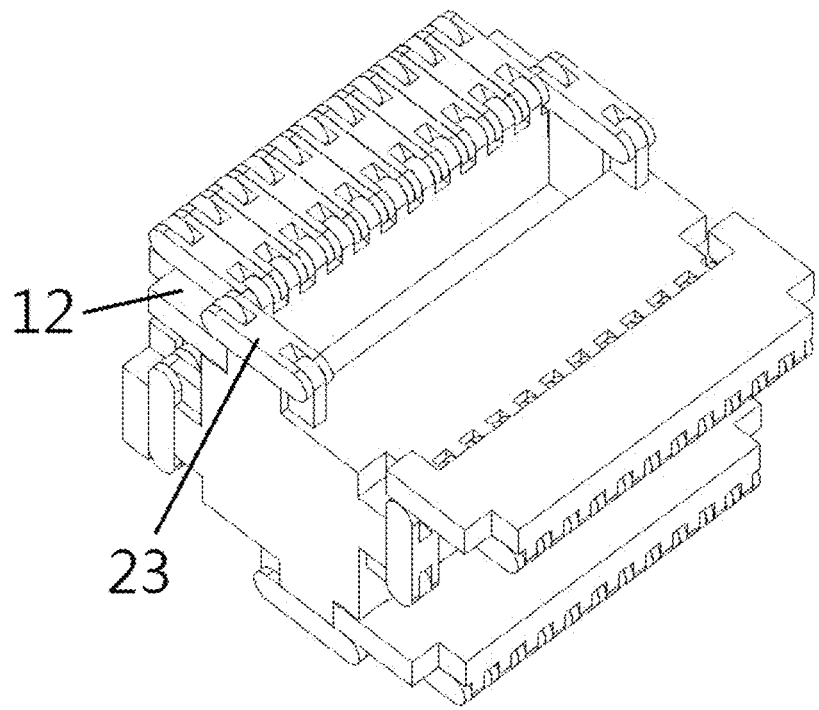

FIGS. 15a-15d show different states of the upper box. The upper box in FIG. 15a is in a closed and locked state. The connection element 21 functions as a cover which closes the box and is not movable in this state. The upper box is turned into an unlocked state shown in FIG. 15b by rotating the second base element 12, as a locking device, 180 degrees anticlockwise. After that, the connection element 21 (cover), together with the second base element 12 (locking device), can be rotated to expose the interior space of the box. FIGS. 15c-15d respectively show the partially opened state and the fully opened state of the upper box.

FIG. 16a-16c illustrates a hinge according to a sixteenth embodiment of the invention. A basic unit is used to explain the structure and connection of the hinge. The sixteenth embodiment is a variant of the first embodiment. In this embodiment, the hinge comprises two base elements 11, 12 and three connection elements 21, 22, 23. The shapes of the base elements 11, 12 and the connection elements 21, 22, 23 have been changed. Particularly, the connecting portions formed by the upward extensions of the second base element 12 have a larger height. Hence, in the first combination state, the first and second base elements 11, 12 are not coplanar and the shape of the first connection element 21 is different from those of the second and third connection elements 22, 23. FIG. 16a-16c respectively show the hinge in the first, second and third combination states. This embodiment explains that the shapes and heights of the base elements can be different from each other. The shapes and heights of the connection element may also differ.

Figure 17A:
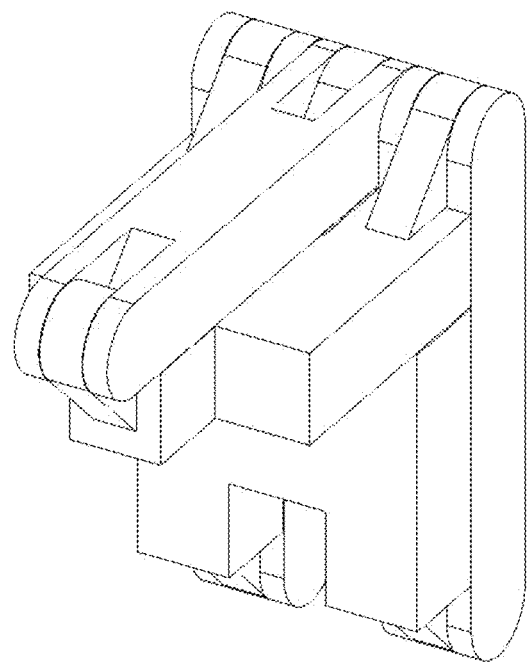
Figure 17B:
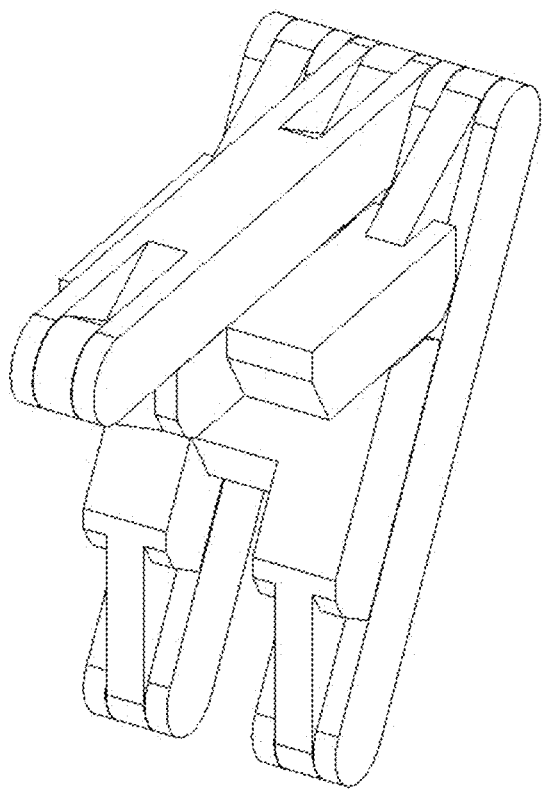
Figure 17C:
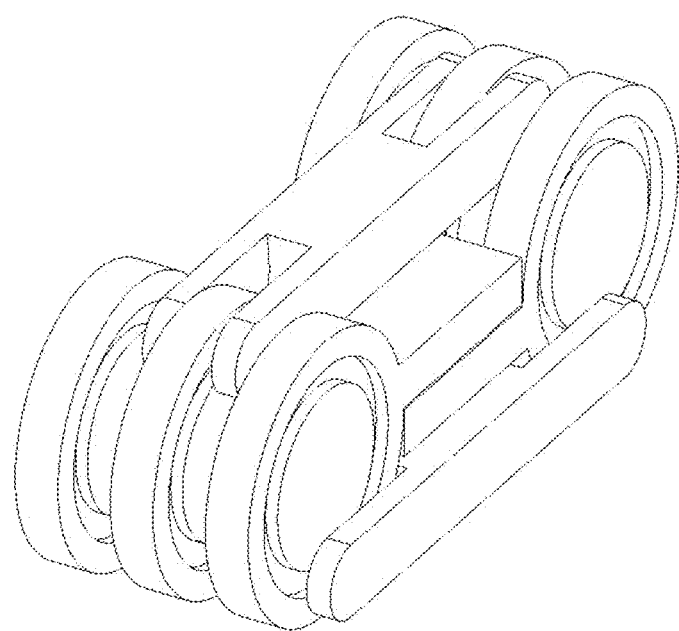

FIG. 17 illustrates a hinge according to a seventeenth embodiment of the invention. A basic unit is used to explain the structure and connection of the hinge. The seventeenth embodiment is a variant of the first embodiment. In this embodiment, the hinge comprises two base elements 11, 12 and three connection elements 21, 22, 23. The shapes of the first and second base elements are the same. However, when the hinge is in the first combination state, the first and second base elements 11, 12 are not coplanar but form an angle. The three connection elements 21, 22, 23 are not coplanar as well. The angle of rotation required to change the hinge from the first state to the second state is larger than 180 degrees. This embodiment shows that the angle of rotation required to change the states of the hinge is not limited to be 180 degrees. For example, FIG. 17a shows a design in which the angle of rotation is 270 degrees. FIG. 17b shows a design in which the angle of rotation is 300 degrees. FIG. 17c shows a design in which the angle of rotation is 360 degrees.

Figure 18:
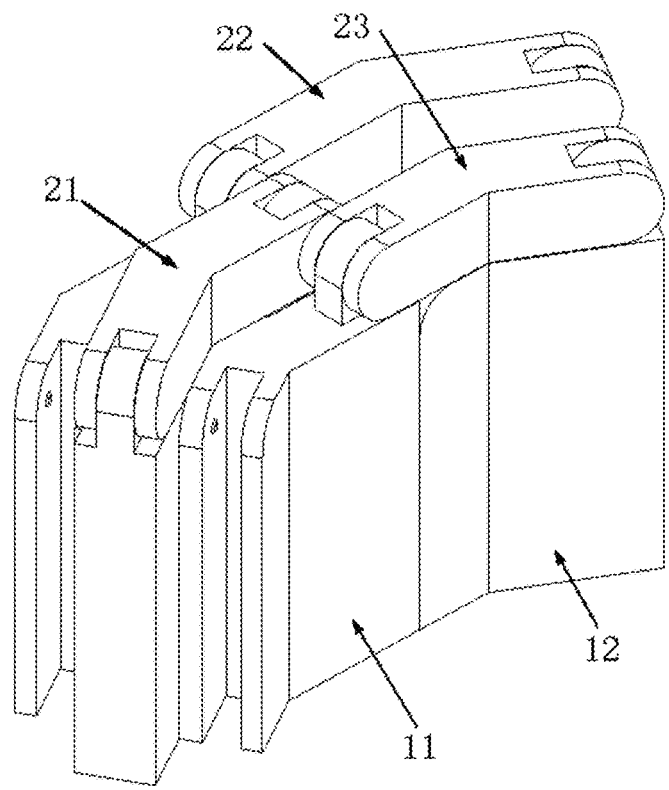
FIG. 18 shows a hinge according to an eighteenth embodiment of the invention.
Figure 19:
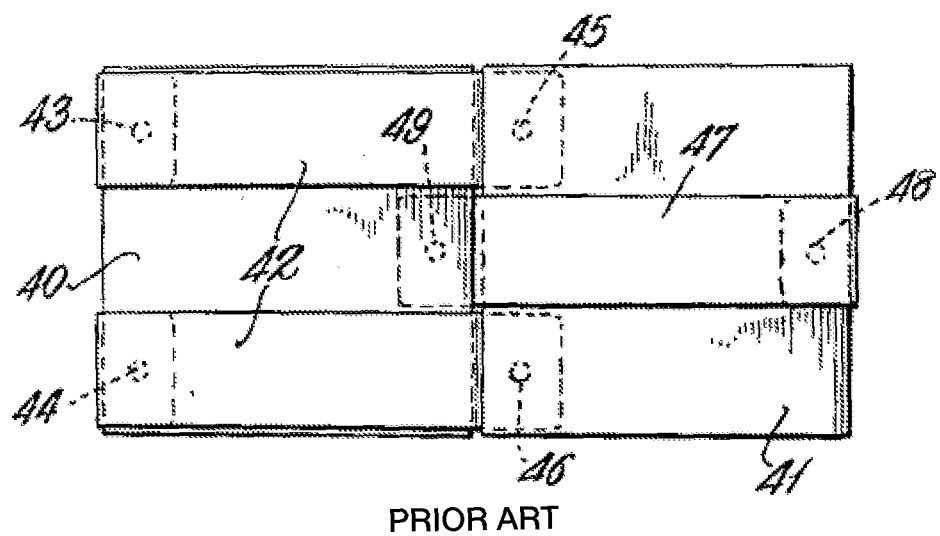
FIGS. 19-20 show a toy formed by a hinge according to the prior art.
Figure 20:
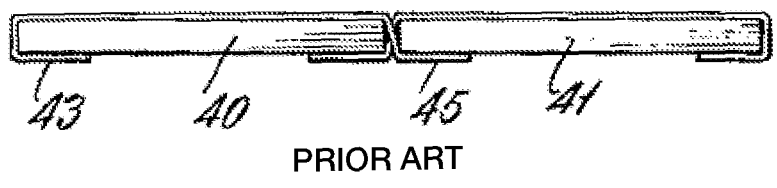

FIG. 18 illustrates a hinge according to an eighteenth embodiment of the invention. A basic unit is used to explain the structure and connection of the hinge. The eighteenth embodiment is a variant of the tenth embodiment. The hinge comprises two base elements 11, 12 and three connection elements 21, 22, 23. In this embodiment, the connection elements 21, 22, 23 are not linear, and the rotational axes of the hinged connections formed on two ends of each connection element are not parallel to each other. The connecting portions of the base elements 11, 12 are not arranged symmetrically.

The hinged connections formed between the connection elements and the base elements in the above-described embodiments can be detachable or non-detachable. That is, all detachable hinged connections in the embodiments can be replaced by non-detachable hinged connections. The detachable hinged connection can be formed by a ball and socket fitting or by adding a rotational axis. The number of rotational axis can be one or more. These axes can be fixed, movable or extendable.

While the invention has been described with reference to an exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

What is claimed is:

1. A double action hinge unit, comprising: a first base element, comprising a first extension and a second extension both extending upward from said first base element;
   a second base element, comprising a fourth extension and a fifth extension both extending upward from said second base element;
   a first connection element that is hingedly connected with said first extension about a first rotational axis and is hingedly connected with said fourth extension about a second rotational axis;
   a second connection element that is hingedly connected with said second extension about a third rotational axis and is hingedly connected with said fifth extension about a fourth rotational axis,
   wherein when said double action hinge unit is in a first combination state, said second and third rotational axes are co-axial, and said first and fourth rotational axes are not co-axial,
   upon rotating said first base element with respect to said second base element about said second and third rotational axes by a certain angle, said double action hinge unit is changed from said first combination state into a second combination state; when said double action hinge unit is in said second combination state, said second and third rotational axes are co-axial, and said first and fourth rotational axes are also co-axial,
   upon rotating said first base element about said second base element about said first and fourth rotational axes by a certain angle, said double action hinge unit is changed from said second combination state into a third combination state, when said double action hinge unit is in said third combination state, said second and third rotational axes are not co-axial, and said first and fourth rotational axes are co-axial;
   wherein, said first base element comprises a first projected portion at a first end and a first recessed portion at a second end, said second base element comprises a second projected portion at a first end and a second recessed portion at a second end; said second projected portion is received in a space of said first recessed portion when said double action hinge unit is in said first combination state, and said first projected portion is received in a space of said second recessed portion when said double action hinge unit is in said third combination state;

wherein, said first base element further comprises a third extension extending upward therefrom, said second base element further comprises a sixth extension extending upward therefrom; said double action hinge unit further comprises a third connection element that is hingedly connected with said third extension about a fifth rotational axis and is hingedly connected with said sixth extension about a sixth rotational axis;

wherein when said double action hinge unit is in said first and second combination states, said second, third and fifth rotational axes are co-axial, when said double action hinge unit is in said second and third combination states, said first, fourth and sixth rotational axes are co-axial;

wherein, said first extension extends upward from said first projected portion, said second and third extensions respectively extend upward from shoulders on two sides of said first recessed portion, said fourth extension extends upward from said second projected portion, said fifth and sixth extensions respectively extend upward from shoulders on two sides of said second recessed portion;

wherein, said first base element further comprises a seventh extension extending downward from said first projected portion, and an eighth and a ninth extensions extending downward from the shoulders on two sides of said first recessed portion, said double action hinge unit further comprises:

a third base element, comprising a third projected portion at a first end, a third recessed portion at a second end, a tenth extension extending downward from said third projected portion, and an eleventh and a twelfth extensions extending downward from shoulders on two sides of said third recessed portion;

a fourth connection element that is hingedly connected with said tenth extension about a seventh rotational axis) and is hingedly connected with said seventh extension about an eighth rotational axis;

a fifth connection element that is hingedly connected with said eleventh extension about a ninth rotational axis and is hingedly connected with said eighth extension about a tenth rotational axis;

a sixth connection element that is hingedly connected with said twelfth extension about an eleventh rotational axis and is hingedly connected with said ninth extension about a twelfth rotational axis;

wherein when said double action hinge unit is in the first combination state, said eighth, ninth and eleventh rotational axes are co-axial, upon rotating said third base element about said first base element around said eighth, ninth and eleventh rotational axes by a certain angle, said double action hinge unit is changed from said first combination state into a fourth combination state; when said double action hinge unit is in said fourth combination state, said eighth, ninth and eleventh rotational axes are co-axial, and said seventh, tenth and twelfth rotational axes are also co-axial.

2. The double action hinge unit according to claim 1, wherein, the height of said first base element is equal to or larger than the sum of heights of the second and third base elements.

3. The double action hinge unit according to claim 1, wherein, said second base element and/or said third base element are configured to include both upward extending extensions and downward extending extensions so as to connect to additional base elements.

\* \* \* \* \*